United States Patent
Sanner et al.

(10) Patent No.: US 10,669,388 B2
(45) Date of Patent: Jun. 2, 2020

(54) POLYETHERIMIDE MISCIBLE POLYMER BLENDS FOR CAPACITOR FILMS

(71) Applicants: SABIC GLOBAL TECHNOLOGIES, B.V., Bergen op Zoom (NL); Mark Sanner, Evansville, IN (US); Neal Pfeiffenberger, Conshohocken, PA (US); Matthew F. Niemeyer, North Chatham, NY (US)

(72) Inventors: Mark Sanner, Evansville, IN (US); Neal Pfeiffenberger, Conshohocken, PA (US); Matthew F. Niemeyer, North Chatham, NY (US)

(73) Assignee: SABIC GLOBAL TECHNOLOGIES, B.V., Bergen op Zoom (NL)

( * ) Notice: Subject to any disclaimer, the term of this patent is extended or adjusted under 35 U.S.C. 154(b) by 275 days.

(21) Appl. No.: 15/544,483

(22) PCT Filed: Oct. 1, 2015

(86) PCT No.: PCT/US2015/053525
§ 371 (c)(1),
(2) Date: Jul. 18, 2017

(87) PCT Pub. No.: WO2016/126290
PCT Pub. Date: Aug. 11, 2016

(65) Prior Publication Data
US 2018/0265655 A1    Sep. 20, 2018

Related U.S. Application Data

(60) Provisional application No. 62/111,458, filed on Feb. 3, 2015, provisional application No. 62/204,139, filed on Aug. 12, 2015.

(51) Int. Cl.
| | |
|---|---|
| C08J 5/18 | (2006.01) |
| H01G 4/18 | (2006.01) |
| C08G 73/10 | (2006.01) |
| B32B 27/28 | (2006.01) |
| B32B 27/36 | (2006.01) |
| B32B 7/12 | (2006.01) |
| C08L 79/08 | (2006.01) |
| B32B 27/00 | (2006.01) |
| B32B 27/18 | (2006.01) |
| B32B 7/00 | (2019.01) |
| B32B 15/00 | (2006.01) |
| B32B 27/06 | (2006.01) |
| B32B 27/08 | (2006.01) |
| B32B 15/04 | (2006.01) |
| B32B 15/08 | (2006.01) |
| H01G 4/008 | (2006.01) |

(52) U.S. Cl.
CPC .......... *C08J 5/18* (2013.01); *B32B 7/00* (2013.01); *B32B 7/12* (2013.01); *B32B 15/00* (2013.01); *B32B 15/04* (2013.01); *B32B 15/08* (2013.01); *B32B 27/00* (2013.01); *B32B 27/06* (2013.01); *B32B 27/08* (2013.01); *B32B 27/18* (2013.01); *B32B 27/28* (2013.01); *B32B 27/281* (2013.01); *B32B 27/36* (2013.01); *C08G 73/1017* (2013.01); *C08G 73/1053* (2013.01); *C08G 73/1071* (2013.01); *C08L 79/08* (2013.01); *H01G 4/008* (2013.01); *H01G 4/18* (2013.01); *B32B 2307/20* (2013.01); *B32B 2307/204* (2013.01); *B32B 2307/30* (2013.01); *B32B 2307/50* (2013.01); *B32B 2307/51* (2013.01); *B32B 2307/516* (2013.01); *B32B 2307/54* (2013.01); *B32B 2307/546* (2013.01); *B32B 2307/732* (2013.01); *B32B 2457/00* (2013.01); *B32B 2457/16* (2013.01); *C08G 73/1064* (2013.01); *C08J 2367/02* (2013.01); *C08J 2379/08* (2013.01); *C08J 2467/02* (2013.01); *C08J 2479/08* (2013.01)

(58) Field of Classification Search
None
See application file for complete search history.

(56) References Cited

U.S. PATENT DOCUMENTS

| | | | |
|---|---|---|---|
| 4,141,927 | A | 2/1979 | White et al. |
| 6,919,422 | B2 | 7/2005 | Gallucci et al. |

(Continued)

FOREIGN PATENT DOCUMENTS

| | | | |
|---|---|---|---|
| EP | 0158733 | A1 | 10/1985 |
| JP | 59210939 | A | 11/1984 |

(Continued)

OTHER PUBLICATIONS

Filing receipt and specification for provisional application entitled "Polyetherimide Miscible Polymer Blends for Capacitor Films," filed Feb. 3, 2015 as U.S. Appl. No. 62/111,458, 90 pages.

(Continued)

*Primary Examiner* — Ana L. Woodward
(74) *Attorney, Agent, or Firm* — Cantor Colburn LLP

(57) ABSTRACT

A uniaxially-stretched, high yield extruded capacitor film comprising a miscible polymer blend comprising a polyetherimide and a polyester, wherein the polyetherimide comprises units derived from polymerization of an aromatic dianhydride with a diamine comprising a m-phenylenediamine, a p-phenylenediamine, or combinations thereof, wherein the polyetherimide is endcapped with a substituted or unsubstituted aromatic primary monoamine, wherein the polyester comprises repeating structural units derived from polymerization of an aromatic dicarboxylic acid with a dihydroxy compound, and wherein the high yield extruded capacitor film comprises equal to or greater than about 90 wt. % of the miscible polymer blend entering an extruder used for manufacturing the capacitor film, based on the total weight of miscible polymer blend prior to entering the extruder.

16 Claims, No Drawings

(56) References Cited

U.S. PATENT DOCUMENTS

| | | |
|---|---|---|
| 8,546,516 B2 | 10/2013 | Gallucci et al. |
| 2002/0114977 A1 | 8/2002 | Kubota et al. |
| 2007/0066739 A1 | 3/2007 | Odle et al. |
| 2008/0044682 A1 | 2/2008 | Chan et al. |
| 2009/0258991 A1 | 10/2009 | Yamaguchi et al. |
| 2010/0259865 A1 | 10/2010 | Tan et al. |
| 2014/0124975 A1 | 5/2014 | Nogami et al. |
| 2014/0275372 A1 | 9/2014 | He et al. |
| 2014/0355173 A1 | 12/2014 | Odle et al. |

FOREIGN PATENT DOCUMENTS

| | | | |
|---|---|---|---|
| JP | 2001172482 A | | 6/2001 |
| JP | 2002134353 A | | 5/2002 |
| JP | 3409771 | * | 5/2003 |
| JP | 2003246870 A | | 9/2003 |
| JP | 2004285298 A | | 10/2004 |
| JP | 2005029688 A | | 2/2005 |
| JP | 2008007750 A | | 1/2008 |
| JP | 2008266600 | | 11/2008 |
| WO | 2012155083 A1 | | 11/2012 |
| WO | 2016126290 A1 | | 8/2016 |
| WO | 2014194212 A1 | | 12/2019 |

OTHER PUBLICATIONS

Filing receipt and specification for provisional application entitled "Polyetherimide Miscible Polymer Blends for Capacitor Films," filed Aug. 12, 2015 as U.S. Appl. No. 62/204,139, 91 pages.

Foreign communication from a related counterpart application—International Search Report and Written Opinion, PCT/US2015/053525, dated Jan. 13, 2016, 19 pages.

Foreign communication from a related counterpart application—International Preliminary Report on Patentability, PCT/US2015/053525, dated May 24, 2017, 12 pages.

European Search Report for European Application No. 15881386.5 dated May 9, 2018, 6 pages.

* cited by examiner

US 10,669,388 B2

POLYETHERIMIDE MISCIBLE POLYMER BLENDS FOR CAPACITOR FILMS

CROSS REFERENCE TO RELATED APPLICATIONS

This application is a filing under 35 U.S.C. 371 of International Application No. PCT/US2015/053525 filed Oct. 1, 2015, which claims priority to U.S. Provisional Patent Application Nos. 62/111,458 filed Feb. 3, 2015 and 62/204,139 filed Aug. 12, 2015, all entitled "Polyetherimide Miscible Polymer Blends for Capacitor Films," each of which applications is incorporated by reference herein in its entirety.

TECHNICAL FIELD

The present disclosure relates to polyetherimide miscible polymer blends and methods of making and using same, more specifically polyetherimide and/or polyetherimide sulfone miscible polymer blends for extruded capacitor films.

BACKGROUND

Electrostatic film capacitors with high volumetric energy density, high operating temperature, and long lifetime are important components for pulse-power, automotive, and industrial electronics. Generally, capacitors are energy-storing devices having two parallel conductive plates separated by a thin layer of an insulating (dielectric) film. When a voltage is applied across the plates, the electric field in the dielectric displaces electric charges, and thus stores energy. The amount of energy stored by a capacitor depends on the dielectric constant of the insulating material, the applied voltage, and the dimensions (total area and thickness) of the film. Consequently, in order to maximize the total amount of energy that a capacitor can accumulate, a dielectric constant and breakdown voltage of the film needs to be maximized, and a thickness of the film minimized. The physical characteristics of the dielectric material in a capacitor are the primary determining factors for the performance of the capacitor, so improvements in one or more of the physical properties of the dielectric material of a capacitor can result in corresponding performance improvements in the capacitor component, usually resulting in performance and lifetime enhancements of the electronics system or product in which the capacitor is embedded.

Electrostatic film capacitors made from biaxially-oriented poly(propylene) (BOPP) have been used in applications requiring a low dissipation factor, high insulation resistance and low dielectric absorption, such as in electrical appliances, electronic equipment, oven and furnaces, refrigerators, automobiles, and home appliances. The low dielectric constant (Dk) of BOPP, which is about 2.2, and its maximum service temperature of about 100° C. limits the use of BOPP capacitors in applications requiring high operating temperatures and/or high energy densities. Other thermoplastic materials, such as polyethylene terephthalate (PET), polyethylene naphthalate (PEN) and polycarbonate (PC) with Dk>3.0 could be reasonable alternatives; however, capacitors made from these films can only be used at operating temperatures as high as about 125° C., therefore not meeting a desired high temperature performance capability. Several materials which meet high temperature capabilities, such as polyphenylene sulfide (PPS) and polyether ether ketone (PEEK), are limited by an instability of electrical properties at temperatures exceeding 150° C., thus making them less desirable for use in capacitors. Thus, there is an ongoing need to develop and/or improve dielectric materials for use in capacitors.

BRIEF SUMMARY

Disclosed herein is a uniaxially-stretched, high yield extruded capacitor film comprising a miscible polymer blend comprising a polyetherimide and a polyester, wherein the polyetherimide comprises units derived from polymerization of an aromatic dianhydride with a diamine comprising a m-phenylenediamine, a p-phenylenediamine, or combinations thereof, wherein the polyetherimide is endcapped with a substituted or unsubstituted aromatic primary monoamine, wherein the polyester comprises repeating structural units derived from polymerization of an aromatic dicarboxylic acid with a dihydroxy compound, and wherein the high yield extruded capacitor film comprises equal to or greater than about 90 wt. % of the miscible polymer blend entering an extruder used for manufacturing the capacitor film, based on the total weight of miscible polymer blend prior to entering the extruder.

Also disclosed herein is a uniaxially-stretched, high yield extruded capacitor film comprising a miscible polymer blend comprising a polyetherimide and a polyester, wherein the polyetherimide comprises units derived from polymerization of an aromatic dianhydride with a diamine comprising a m-phenylenediamine, a p-phenylenediamine, or combinations thereof, wherein the polyetherimide is endcapped with a substituted or unsubstituted aromatic primary monoamine, wherein the polyester comprises repeating structural units derived from polymerization of an aromatic dicarboxylic acid with a dihydroxy compound, wherein the high yield extruded capacitor film is solvent-free and comprises equal to or greater than about 90 wt. % of the miscible polymer blend entering an extruder used for manufacturing the capacitor film, based on the total weight of miscible polymer blend prior to entering the extruder, and wherein the capacitor film has a film thickness of from about 0.1 microns to about 20 microns.

Further disclosed herein is a uniaxially-stretched, high yield extruded capacitor film comprising a miscible polymer blend comprising a polyetherimide sulfone and a polyester, wherein the polyetherimide sulfone comprises units derived from polymerization of an aromatic dianhydride with a diamine comprising a diamino diphenyl sulfone, wherein the polyetherimide sulfone is endcapped with a substituted or unsubstituted aromatic primary monoamine, wherein the polyester comprises repeating structural units derived from polymerization of an aromatic dicarboxylic acid with a dihydroxy compound, wherein the high yield extruded capacitor film is solvent-free and comprises equal to or greater than about 90 wt. % of the miscible polymer blend entering an extruder used for manufacturing the capacitor film, based on the total weight of miscible polymer blend prior to entering the extruder.

DETAILED DESCRIPTION

Disclosed herein are polymer compositions for capacitor films comprising a polyetherimide (PEI) and a polyester (PE) and methods of making and using same, wherein the polymer compositions are miscible polymer blends, as will be discussed in more detail herein. In an embodiment, the polyetherimide can further comprise a polyetherimide sulfone, wherein the polyetherimide and the polyetherimide sulfone form a miscible polymer blend. In an embodiment, the polyester comprises polyethylene terephthalate (PET), polyethylene naphthalate (PEN), and the like, or combinations thereof. In an embodiment, the polyester comprises a low intrinsic viscosity PET. In an embodiment, the polyetherimide and the polyester form a miscible polymer blend. In another embodiment, the polyetherimide, the polyetherimide sulfone, and the polyester form a miscible polymer blend.

In some embodiments, the polymer compositions for capacitor films comprise a polyetherimide sulfone (PEIS) and a polyester (PE), wherein the polymer compositions are miscible polymer blends. In such embodiments, the polyetherimide sulfone and the polyester form a miscible polymer blend.

Disclosed herein are uniaxially-stretched, high yield extruded capacitor films comprising a miscible polymer blend comprising a polyetherimide and a polyester; wherein the polyetherimide comprises units derived from polymerization of an aromatic dianhydride with a diamine comprising a m-phenylenediamine, a p-phenylenediamine, or combinations thereof; wherein the polyetherimide is endcapped with a substituted or unsubstituted aromatic primary monoamine; wherein the polyester comprises repeating structural units derived from polymerization of an aromatic dicarboxylic acid with a dihydroxy compound; and wherein the high yield extruded capacitor film comprises equal to or greater than about 90 wt. % of the miscible polymer blend entering an extruder used for manufacturing the capacitor film, based on the total weight of miscible polymer blend prior to entering the extruder. In an embodiment, the polyetherimide can further comprise a polyetherimide sulfone.

In an embodiment, a method of manufacturing the uniaxially-stretched, high yield extruded capacitor film, for example the film described in the preceding paragraph, comprises (a) combining the polyetherimide and the polyester to form a miscible polymer blend; (b) melting and mixing the miscible polymer blend to form a molten polymer; (c) filtering the molten polymer to remove particles greater than about 1 micron to form a filtered molten polymer; (d) extruding the filtered molten polymer through a flat die at a temperature of from about 250° C. to about 500° C. to form a high yield extruded capacitor film, wherein the high yield extruded capacitor film comprises equal to or greater than about 90 wt. % of the miscible polymer blend entering an extruder used for manufacturing the capacitor film, based on the total weight of miscible polymer blend prior to entering the extruder; and (e) uniaxially stretching the high yield extruded capacitor film to form the uniaxially-stretched, high yield extruded capacitor film. In such embodiment, the uniaxially-stretched, high yield extruded capacitor film can be further metallized and wound to form a wound metallized capacitor film. In another embodiment, the capacitor films (e.g., metallized capacitor films) can be stacked to form a stacked film capacitor.

Disclosed herein are uniaxially-stretched, high yield extruded capacitor films comprising a miscible polymer blend comprising a polyetherimide sulfone and a polyester; wherein the polyetherimide sulfone comprises units derived from polymerization of an aromatic dianhydride with a diamine comprising a diamino diphenyl sulfone; wherein the polyetherimide sulfone is endcapped with a substituted or unsubstituted aromatic primary monoamine; wherein the polyester comprises repeating structural units derived from polymerization of an aromatic dicarboxylic acid with a dihydroxy compound; and wherein the high yield extruded capacitor film comprises equal to or greater than about 90 wt. % of the miscible polymer blend entering an extruder used for manufacturing the capacitor film, based on the total weight of miscible polymer blend prior to entering the extruder.

In an embodiment, a method of manufacturing the uniaxially-stretched, high yield extruded capacitor film, for example the film described in the preceding paragraph, comprises (a) combining the polyetherimide sulfone and the polyester to form a miscible polymer blend; (b) melting and mixing the miscible polymer blend to form a molten polymer; (c) filtering the molten polymer to remove particles greater than about 1 micron to form a filtered molten polymer; (d) extruding the filtered molten polymer through a flat die at a temperature of from about 250° C. to about 500° C. to form a high yield extruded capacitor film, wherein the high yield extruded capacitor film comprises equal to or greater than about 90 wt. % of the miscible polymer blend entering an extruder used for manufacturing the capacitor film, based on the total weight of miscible polymer blend prior to entering the extruder; and (e) uniaxially stretching the high yield extruded capacitor film to form the uniaxially-stretched, high yield extruded capacitor film. In such embodiment, the uniaxially-stretched, high yield extruded capacitor film can be further metallized and wound to form a wound metallized capacitor film. In another embodiment, the capacitor films (e.g., metallized capacitor films) can be stacked to form a stacked film capacitor.

Other than in the operating examples or where otherwise indicated, all numbers or expressions referring to quantities of ingredients, reaction conditions, and the like, used in the specification and claims are to be understood as modified in all instances by the term "about." Various numerical ranges are disclosed herein. Because these ranges are continuous, they include every value between the minimum and maximum values. The endpoints of all ranges reciting the same characteristic or component are independently combinable and inclusive of the recited endpoint. Unless expressly indicated otherwise, the various numerical ranges specified in this application are approximations. The endpoints of all ranges directed to the same component or property are inclusive of the endpoint and independently combinable. The term "from more than 0 to an amount" means that the named component is present in some amount more than 0, and up to and including the higher named amount.

The terms "a," "an," and "the" do not denote a limitation of quantity, but rather denote the presence of at least one of the referenced item. As used herein the singular forms "a," "an," and "the" include plural referents.

As used herein, "combinations thereof" is inclusive of one or more of the recited elements, optionally together with a like element not recited, e.g., inclusive of a combination of one or more of the named components, optionally with one or more other components not specifically named that have essentially the same function. As used herein, the term "combination" is inclusive of blends, mixtures, alloys, reaction products, and the like.

Reference throughout the specification to "an embodiment," "another embodiment," "other embodiments," "some embodiments," and so forth, means that a particular element (e.g., feature, structure, property, and/or characteristic) described in connection with the embodiment is included in at least an embodiment described herein, and may or may not be present in other embodiments. In addition, it is to be understood that the described element(s) can be combined in any suitable manner in the various embodiments.

Unless defined otherwise, technical and scientific terms used herein have the same meaning as is commonly understood by one of skill in the art. The term "polymer" as used herein includes oligomers, homopolymers, and copolymers.

All molecular weights in this application refer to weight average molecular weights unless indicated otherwise. All such mentioned molecular weights are expressed in Daltons (Da).

Compounds are described herein using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through the carbon of the carbonyl group.

The term "alkyl" includes both $C_{1-30}$ branched and straight chain, alternatively $C_{1-8}$ branched and straight chain, unsaturated aliphatic hydrocarbon groups having the specified number of carbon atoms. Examples of alkyl include, but are not limited to, methyl, ethyl, n-propyl, i-propyl, n-butyl, s-butyl, t-butyl, n-pentyl, s-pentyl, n- and s-hexyl, n- and s-heptyl, n- and s-octyl, decyl, stearyl, and the like.

The term "alkenyl" means a straight or branched chain, monovalent hydrocarbon group having at least one carbon-carbon double bond (e.g., ethenyl (—HC=CH$_2$)).

The term "alkoxy" means a straight or branched alkyl group (e.g., $C_{1-18}$) that is linked via an oxygen (i.e., alkyl-O—), for example methoxy, ethoxy, sec-butyloxy, and nonyloxy groups.

The term "alkylene" means a straight or branched chain, saturated, divalent aliphatic hydrocarbon group (e.g., methylene (—CH$_2$—), or propylene (—(CH$_2$)$_3$—)).

The term "cycloalkylene" means a divalent cyclic alkylene group, —C$_n$H$_{2n-x}$, wherein x represents the number of hydrogens replaced by cyclization(s). "Cycloalkenyl" means a monovalent group having one or more rings and one or more carbon-carbon double bond in the ring, wherein all ring members are carbon (e.g., cyclopentyl and cyclohexyl).

The term "aryl" means an aromatic hydrocarbon group (e.g., aromatic moiety) containing the specified number of carbon atoms (e.g., an unsaturated ring of six carbon atoms), which may optionally be substituted with one or more alkyl groups, and includes, for example phenyl, tolyl, xylyl, tropone, indanyl, indenyl, naphthyl, and the like.

The term "aryloxy" means an oxygen radical that is substituted with an unsaturated ring of six carbon atoms, which itself may optionally be substituted with one or more alkyl groups, and includes, for example, phenoxy.

The prefix "halo" means a group or compound including one more of a fluoro, chloro, bromo, iodo, and astatino substituent. A combination of different halo groups (e.g., bromo and fluoro) can be present. In an embodiment, only chloro groups are present.

The prefix "hetero" means that the compound or group includes at least one ring member that is a heteroatom (e.g., 1, 2, or 3 heteroatom(s)), wherein the heteroatom(s) can each independently be N, O, S, or P.

All ASTM tests are based on the 2003 edition of the Annual Book of ASTM Standards, unless otherwise indicated.

In an embodiment, the polymer composition for capacitor films comprises a polyetherimide. In another embodiment, the polymer composition for capacitor films comprises a polyetherimide sulfone. In yet another embodiment, the polymer composition for capacitor films comprises a polyetherimide and a polyetherimide sulfone.

For purposes of the disclosure herein, a polymer component comprising either only polyetherimide, or only polyetherimide sulfone, or both polyetherimide and polyetherimide sulfone will be referred to collectively as "polyetherimide and/or polyetherimide sulfone." As used herein with respect to any of the described polymer (e.g., single polymer component, polymer blend, polymer mixture, etc.) properties, characteristics, features, etc., the term "polyetherimide and/or polyetherimide sulfone" means that any of the property values, characteristics, features, etc. can be applied either to the polyetherimide only, or to the polyetherimide sulfone only, or to both the polyetherimide and polyetherimide sulfone when used in combination.

In an embodiment, the polyetherimides (PEI) and polyetherimide sulfones (PEIS) can be represented by Formula I:

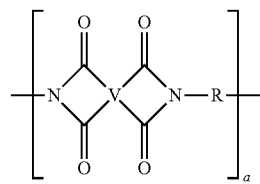

Formula I wherein a can be more than 1, for example from about 1 to about 1,000 or more, alternatively from about 10 to about 1,000 or more, or alternatively from about 10 to about 500.

In an embodiment, the group V in Formula I can be a tetravalent linker containing an ether group (a "polyetherimide" as used herein) or a combination of ether groups and arylene sulfone groups (a "polyetherimide sulfone" as used herein). Such linkers can include, but are not limited to: (a) substituted or unsubstituted, saturated, unsaturated or aromatic monocyclic and polycyclic groups having from 5 to 50 carbon atoms, optionally substituted with ether groups, arylene sulfone groups, or a combination of ether groups and arylene sulfone groups; (b) substituted or unsubstituted, linear or branched, saturated or unsaturated alkyl groups having from 1 to 30 carbon atoms and optionally substituted with ether groups or a combination of ether groups, arylene sulfone groups, and arylene sulfone groups; or (c) combinations thereof. Suitable additional substitutions for the linker group V include, but are not limited to ethers, amides, esters, and the like, or combinations thereof.

In an embodiment, the group R in Formula I can include, but is not limited to substituted or unsubstituted divalent organic groups such as: (a) aromatic hydrocarbon groups having from 6 to 20 carbon atoms and halogenated derivatives thereof; (b) straight or branched chain alkylene groups having from 2 to 20 carbon atoms; (c) cycloalkylene groups having from 3 to 20 carbon atoms, or (d) divalent groups as represented by Formula II:

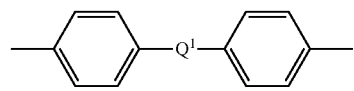

Formula II wherein $Q^1$ includes, but is not limited to a divalent moiety such as —O—, —S—, —C(O)—, —SO$_2$—, —SO—, —C$_{y-2y}$— (y being an integer from 1 to 5), and halogenated derivatives thereof, including perfluoroalkylene groups.

In an embodiment of Formula I, linkers V include, but are not limited to tetravalent aromatic groups as represented by Formula III:

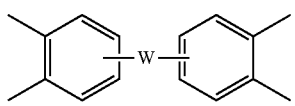

Formula III wherein W can be a divalent moiety including —O—, —SO₂—, or a group represented by formula —O—Z—O—, wherein the divalent bonds of the —O— or the —O—Z—O— group can be in the 3,3'; 3,4'; 4,3'; or 4,4' positions. As will be appreciated by one of skill in the art, and with the help of this disclosure, while the —O—Z—O— group is a divalent group, Z is also a divalent group, and each of the Z divalencies is linked to an oxygen atom in the —O—Z—O— group. In such embodiment, Z can include, but is not limited to divalent groups as represented by Formulas of Group IV:

Formulas of Group IV

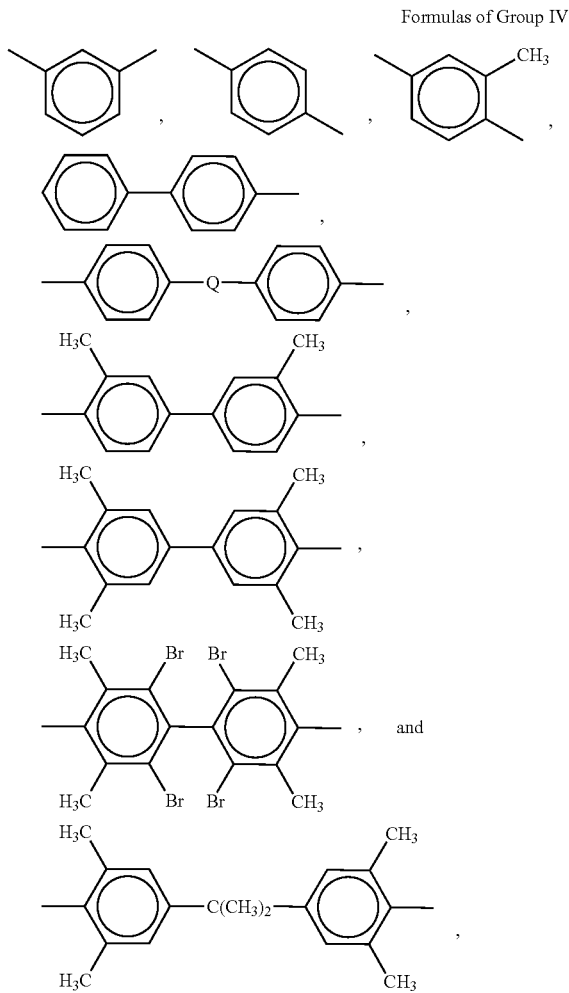

wherein Q can include, but is not limited to a divalent moiety such as —O—, —S—, —C(O)—, —SO₂—, —SO—, —C$_{y-2y}$— (y being an integer from 1 to 5), and halogenated derivatives thereof, including perfluoroalkylene groups.

In an embodiment, Z can be a divalent group as represented by Formula IVa:

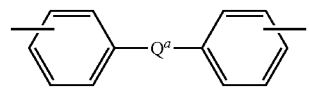

Formula IVa wherein $Q^a$ can be a single bond, —O—, —S—, —C(O)—, —SO₂—, —SO—, or —C$_{y-2y}$—, halogenated derivatives thereof, and wherein y can be an integer from 1 to 5.

In an embodiment, the polyetherimide comprises more than more than 1 structural unit, alternatively from about 10 to about 1,000 structural units, or alternatively from about 10 to about 500 structural units, wherein a structural unit can be represented by Formula V:

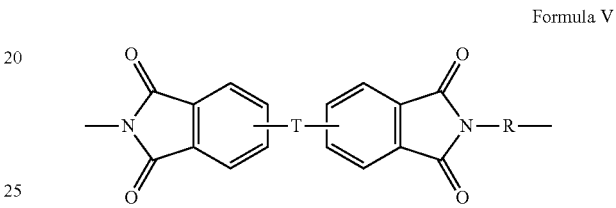

Formula V wherein T can be —O— or a group represented by formula —O—Z—O—, wherein the divalent bonds of the —O— or the —O—Z—O— group can be in the 3,3'; 3,4'; 4,3'; or 4,4' positions; wherein Z has been described previously herein as divalent groups represented by Formulas of Group IV and Formula IVa; and wherein R has been described previously herein as divalent groups represented by Formula II. Any aspect and/or embodiment of these Z and R descriptions can be utilized without limitation to describe the Z and R groups of Formula V. In an embodiment, Z can be represented by Formula IVa.

In an embodiment of Formula V, wherein T is represented by formula —O—Z—O—, Z can be a divalent aromatic hydrocarbon group having from 6 to 27 carbon atoms, a halogenated derivative thereof, a straight or branched chain alkylene group having from 2 to 10 carbon atoms, a halogenated derivative thereof, a cycloalkylene group having from 3 to 20 carbon atoms, a halogenated derivative thereof, or a group represented by formula —(C₆H₁₀)$_z$—, wherein z can be an integer from 1 to 4; and R can be a residue of a diamine comprising a m-phenylenediamine, a p-phenylenediamine, or combinations thereof.

In another embodiment, the polyetherimide sulfones can be polyimides comprising ether groups and sulfone groups wherein at least 50 mol % of the linkers V and the groups R in Formula I comprise a divalent arylene sulfone group. For example, all linkers V, but no groups R, can contain an arylene sulfone group; all groups R but no linkers V can contain an arylene sulfone group; or an arylene sulfone can be present in some fraction of the linkers V and R groups, provided that the total mole fraction of V and R groups containing an aryl sulfone group is equal to or greater than 50 mol %.

In an embodiment, the polyetherimide sulfone comprises more than 1 structural unit, alternatively from about 10 to about 1,000 structural units, or alternatively from about 10 to about 500 structural units, wherein a structural unit can be represented by Formula VI:

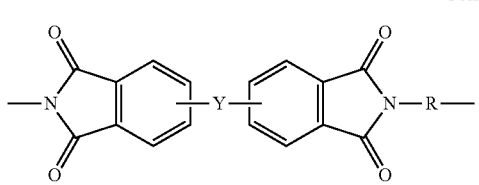

Formula VI

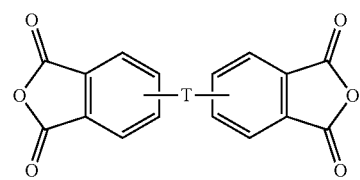

Formula VIII wherein Y can be —O—, —SO$_2$—, or a group represented by formula —O—Z—O—, wherein the divalent bonds of the —O—, —SO$_2$—, or the —O—Z—O— group can be in the 3,3'; 3,4'; 4,3'; or 4,4' positions; wherein Z has been described previously herein as divalent groups represented by Formulas of Group IV and Formula IVa; and wherein R has been described previously herein as divalent groups represented by Formula II, provided that greater than 50 mol % of the sum of moles of Y+moles of R in Formula VI contain —SO$_2$— groups. Any aspect and/or embodiment of these Z and R descriptions can be utilized without limitation to describe the Z and R groups of Formula VI. In an embodiment, Z can be represented by Formula IVa.

In some embodiments, the polyetherimides and/or polyetherimide sulfones can further comprise linkers V that do not contain ether or ether and sulfone groups, such as for example linkers as represented by Formulas of Group VII:

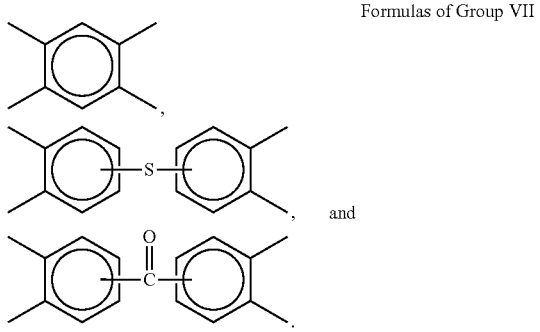

Formulas of Group VII

In an embodiment, imide units containing linkers represented by Formulas of Group VII can generally be present in amounts ranging from about 0 mol % to about 10 mol % of the total number of units, or alternatively from 0 mol % to 5 mol % of the total number of units. In an embodiment, no additional linkers V are present in the polyetherimides and/or polyetherimide sulfones.

In yet another embodiment, the polyetherimide comprises from about 10 to about 500 structural units represented by Formula V, and the polyetherimide sulfone comprises from about 10 to about 500 structural units represented by Formula VI.

Methods for preparing polyetherimide and polyetherimide sulfones are known to one of skill in the art, and are generally described in U.S. Pat. No. 8,546,516 and U.S. Publication No. 20140355173 A1; each of which is incorporated by reference herein in its entirety.

In an embodiment, the polyetherimide and polyetherimide sulfones can be prepared by the reaction of an aromatic bisanhydride as represented by Formula VIII or Formula IX:

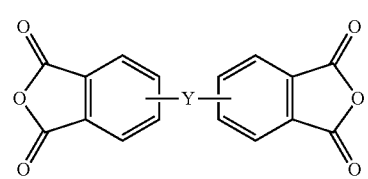

Formula IX with an organic diamine as represented by Formula X:

H$_2$N—R—NH$_2$     Formula X wherein R, T, and Y have been described previously herein for Formula II, Formula V, and Formula VI. Any aspect and/or embodiment of these R, T, and Y descriptions can be utilized without limitation to describe the R, T, and Y groups of Formula VIII, Formula IX and Formula X.

Nonlimiting examples of aromatic bisanhydrides represented by Formula VIII suitable for use in the present disclosure include 2,2-bis[4-(3,4-dicarboxyphenoxy)phenyl]propane dianhydride; 4,4'-bis(3,4-dicarboxyphenoxy) diphenyl ether dianhydride; 4,4'-bis(3,4-dicarboxyphenoxy) diphenyl sulfide dianhydride; 4,4'-bis(3,4-dicarboxyphenoxy)benzophenone dianhydride; 2,2-bis[4-(2,3-dicarboxyphenoxy)phenyl]propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4-(2,3-dicarboxyphenoxy)-4'-(3,4-dicarboxyphenoxy)diphenyl-2,2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxy-phenoxy)benzophenone dianhydride; and the like; or combinations thereof.

Nonlimiting examples of aromatic bisanhydrides containing sulfone groups represented by Formula IX suitable for use in the present disclosure include 4,4'-bis(3,4-dicarboxyphenoxy)diphenyl sulfone dianhydride; 4,4'-bis(2,3-dicarboxyphenoxy)diphenyl sulfone dianhydride; 4-(2,3-dicarboxyphenoxy)-4'-(3,4-dicarboxyphenoxy)diphenyl sulfone dianhydride; and the like; or combinations thereof.

In an embodiment, the polyetherimide sulfones can be prepared using a combination of bisanhydrides represented by Formula VIII and Formula IX.

Nonlimiting examples of amine compounds represented by Formula X suitable for use in the present disclosure include ethylenediamine, propylenediamine, trimethylenediamine, diethylenetriamine, triethylenetetramine, hexamethylenediamine, heptamethylenediamine, octamethylenediamine, nonamethylenediamine, decamethylenediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2- dimethylpropylenediamine, N-methyl-bis(3-aminopropyl) amine, 3-methoxyhexamethylenediamine, 1,2-bis(3-aminopropoxy)ethane, bis(3-aminopropyl)sulfide, 1,4-cyclohexanediamine, bis-(4-aminocyclohexyl)methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl)methane, bis(2-chloro-4-amino-3,5-diethylphenyl)methane, bis(4-aminophenyl)propane, 2,4-bis(b-amino-t-butyl)toluene, bis(p-b-amino-t-butylphenyl)ether, bis(p-b-methyl-o-aminophenyl)benzene, bis(p-b-methyl-o-aminopentyl)benzene, 1,3-diamino-4-isopropylbenzene, bis(4-aminophenyl)ether, 1,3-bis(3-aminopropyl)tetramethyldisiloxane, and the like, or combinations thereof.

Nonlimiting examples of amine compounds containing sulfone groups represented by Formula X suitable for use in the present disclosure include a diamino diphenyl sulfone (DDS), 4,4'-diaminodiphenylsulfone (4,4'-DDS), 3,3'-diaminodiphenylsulfone (3,3'-DDS), bis(aminophenoxy phenyl)sulfones (BAPS), and the like, or combinations thereof.

In an embodiment, the polyetherimide comprises structural units represented by Formula V, wherein each R can independently be p-phenylene, m-phenylene, or combinations thereof; and wherein T can be a group represented by formula —O—Z—O—, wherein the divalent bonds of the —O—Z—O— group can be in the 3,3' positions, and wherein Z can be a divalent group as represented by Formula XI:

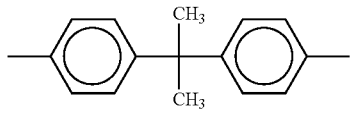

Formula XI

In an embodiment, the polyetherimide comprises structural units represented by Formula Va:

In an embodiment, the structural units represented by Formula V, wherein R is p-phenylene, wherein T is represented by formula —O—Z—O—, wherein the divalent bonds of the —O—Z—O— group are in the 3,3' positions, and wherein Z is a divalent group represented by Formula XI, comprise structural units represented by Formula Va.

In an embodiment, the structural units represented by Formula V, wherein R is m-phenylene, wherein T is represented by formula —O—Z—O—, wherein the divalent bonds of the —O—Z—O— group are in the 3,3' positions, and wherein Z is a divalent group represented by Formula XI, comprise structural units represented by Formula Vb.

In an embodiment, the polyetherimide comprises more than more than 1 structural unit, alternatively from about 10 to about 1,000 structural units, or alternatively from about 10 to about 500 structural units, wherein a structural unit can be represented by Formula Va, Formula Vb, or combinations thereof.

In an embodiment, the polyetherimide sulfone comprises structural units represented by Formula VI, wherein at least 50 mol % of the R groups can each independently be represented by Formulas of Group IV and Formula IVa, wherein Q and $Q^a$ can be —$SO_2$—, and wherein the remaining R groups can each independently be p-phenylene, m-phenylene, or combinations thereof; and wherein Y can be a group represented by formula —O—Z—O—, wherein the divalent bonds of the —O—Z—O— group can be in the 3,3' positions, and wherein Z can be a divalent group represented by Formula XI.

In an embodiment, the polyetherimide sulfone can comprise repeating structural units derived from polymerization of an amine comprising a diamino diphenyl sulfone.

In an embodiment, the polyetherimide sulfone can comprise repeating structural units as represented in Formula VIa:

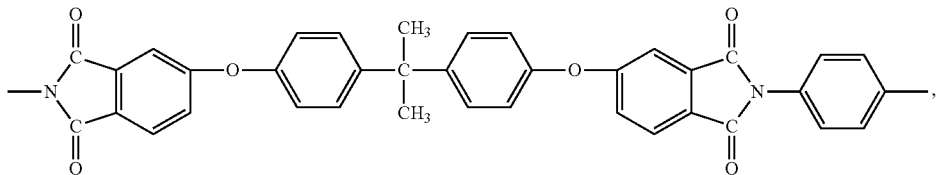

Formula Va structural units represented by Formula Vb:

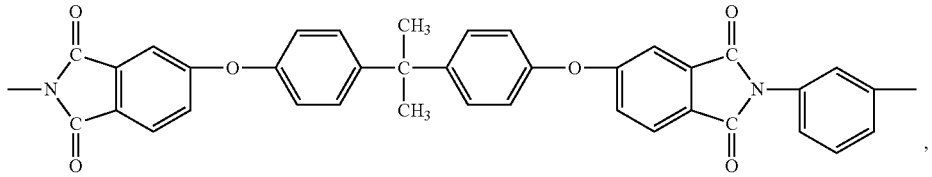

Formula Vb or combinations thereof.

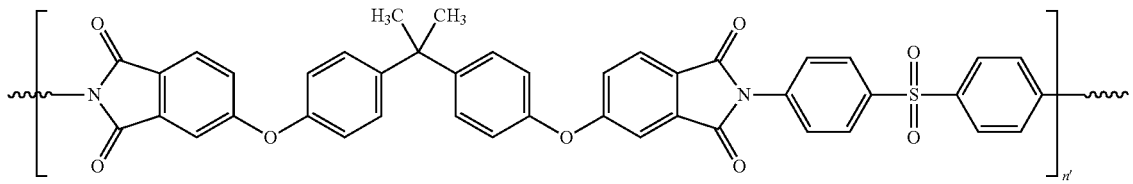

Formula VIa wherein the structural units of can be repeated n' times, and wherein n' can be more than 1, alternatively from about 10 to about 1,000, or alternatively from about 10 to about 500.

In an embodiment, the structural units represented by Formula VI, wherein Y is represented by formula —O—Z—O—, wherein the divalent bonds of the —O—Z—O— group are in the 3,3' positions, wherein Z is a divalent group represented by Formula XI, wherein R is a divalent group represented by Formula IVa, wherein $Q^a$ is —$SO_2$—, and wherein each of the divalencies of the divalent group R are in para position (4,4' positions) with respect to the —$SO_2$—, comprise structural units as represented in Formula VIa.

In an embodiment, the polyetherimide and/or polyetherimide sulfone can be endcapped with a substituted or unsubstituted aromatic primary monoamine, such as for example substituted and unsubstituted anilines, substituted and unsubstituted naphthyl primary amines, and substituted and unsubstituted heteroaryl amines, wherein substituents can be selected from the group consisting of $C_{6-12}$ aryl groups, halogenated $C_{6-12}$ aryl groups, $C_{1-12}$ alkyl groups, halogenated $C_{1-12}$ alkyl groups, sulfone groups, $C_{1-12}$ ester groups, $C_{1-12}$ amide groups, halogens, $C_{1-12}$ alkyl ether groups, $C_{6-12}$ aryl ether groups, and $C_{6-12}$ aryl keto groups bonded to the aromatic ring. The attached functionality should not impede the function of the aromatic primary monoamine to control molecular weight. Suitable examples of aromatic monoamines are described in more detail in U.S. Pat. No. 6,919,422, which is incorporated by reference herein in its entirety. Nonlimiting examples of aromatic monoamines suitable for use in the present disclosure include aniline, chloro aniline, perfluoromethylaniline, naphthylamines, and the like, or combinations thereof. In an embodiment, the aromatic monoamine comprises aniline.

As will be appreciated by one of skill in the art, and with the help of this disclosure, the amount of aromatic monoamine added during manufacturing the polyetherimide and/or polyetherimide sulfone can depend on the desired molecular weight and various other considerations. In an embodiment, the amount of aromatic monoamine present in an imidization reaction can be from about 0 mol % to about 10 mol %, alternatively from about 1 mol % to about 10 mol %, alternatively from about 2 mol % to about 10 mol %, alternatively from about 5 mol % to about 9 mol %, or alternatively from about 6 mol % to about 7 mol %, based on total number of moles of aromatic diamine (e.g., phenylene diamine). Further, as will be appreciated by one of skill in the art, and with the help of this disclosure, the monofunctional reactant can be added at any time (e.g., to the aromatic diamine, the aromatic dianhydride, the solvent, or a combination thereof), such as for example before or after imidization has started, as well as in the presence or absence of the imidization catalyst. Further, as will be appreciated by one of skill in the art, and with the help of this disclosure, specific amounts can be determined by routine experimentation.

In an embodiment, relative amounts of each reactant, type and amount of catalyst, type and amount of aromatic primary monoamine, and reaction conditions can be selected to provide a polyetherimide and/or polyetherimide sulfone having from about 1.0 to about 1.4 molar equivalents of anhydride groups per 1.0 amine groups, alternatively from about 1.0 to about 1.3 molar equivalents of anhydride groups per 1.0 amine groups, alternatively from about 1.0 to about 1.2 molar equivalents of anhydride groups per 1.0 amine groups, alternatively from about 1.0 to about 1.1 molar equivalents of anhydride groups per 1.0 amine groups, or alternatively from about 1.0 to about 1.002 molar equivalents of anhydride groups per 1.0 amine groups.

In an embodiment, the polyetherimide and/or polyetherimide sulfone can be further crosslinked. As will be appreciated by one of skill in the art, and with the help of this disclosure, methods for crosslinking polyetherimide and/or polyetherimide sulfone can include any known polyetherimide and/or polyetherimide sulfone crosslinking methods, such as for example irradiating the polyetherimide and/or polyetherimide sulfone (e.g., an extruded film comprising polyetherimide and/or polyetherimide sulfone) at a wavelength and for a time effective to crosslink the polyetherimide and/or polyetherimide sulfone. In an embodiment, polyetherimide and/or polyetherimide sulfone crosslinking can be achieved by ultraviolet irradiation at a wavelength greater than 280 nm and less than or equal to 400 nm.

In an embodiment, the polyetherimide can be branched polyetherimide, unbranched polyetherimide, or combinations thereof. As will be appreciated by one of skill in the art, and with the help of this disclosure, a degree of polyetherimide branching impacts the strength properties of the polyetherimide, e.g., the higher the content of the branched polyetherimide, the higher the strength.

In an embodiment, the polyetherimide sulfone can be branched polyetherimide sulfone, unbranched polyetherimide sulfone, or combinations thereof. As will be appreciated by one of skill in the art, and with the help of this disclosure, a degree of polyetherimide sulfone branching impacts the strength properties of the polyetherimide sulfone, e.g., the higher the content of the branched polyetherimide sulfone, the higher the strength.

The polyetherimide and polyetherimide sulfone can be used alone or in combination. In some embodiments, the polymer composition for capacitor films comprises a polyetherimide. In other embodiments, the polymer composition for capacitor films comprises a polyetherimide sulfone.

In yet other embodiments, the polymer composition for capacitor films comprises a polyetherimide and a polyetherimide sulfone. In such embodiments, a weight ratio of polyetherimide:polyetherimide sulfone can be from about 99:1 to about 30:70, alternatively from about 90:10 to about 40:60, or alternatively from about 80:20 to about 60:40. As will be appreciated by one of skill in the art, and with the help of this disclosure, polyetherimide and polyetherimide sulfone form a miscible polymer blend.

In an embodiment, the polyetherimide and/or polyetherimide sulfone can be characterized by a weight average molecular weight (Mw) of from about 20,000 grams per mole (g/mol) or Dalton (Da) to about 400,000 Da, alternatively from about 10,000 Da to about 400,000, Da, alternatively from about 10,000 Da to about 200,000 Da, alternatively from about 10,000 Da to about 80,000 Da, or alternatively from about 50,000 Da to about 75,000 Da, as measured by gel permeation chromatography (GPC), using a polystyrene standard. Generally, Mw can be calculated according to equation 1:

$$M_w = \frac{\sum_i N_i M_i^2}{\sum_i N_i M_i} \quad (1)$$

wherein $N_i$ is the number of molecules of molecular weight $M_i$.

In an embodiment, the polyetherimide and/or polyetherimide sulfone can have a benzylic proton content of the less than about 100 ppm, alternatively less than about 50 ppm, or alternatively less than about 10 ppm, based on parts by weight of the polymer, as determined by proton nuclear magnetic resonance spectroscopy. Benzylic proton functionality can react at high temperatures to accelerate reactions that change molecular weight in a melt state. In another embodiment, polyetherimide and/or polyetherimide sulfone can be free, substantially free, or essentially free of benzylic protons. Essentially free of benzylic protons means that a polyetherimide and/or polyetherimide sulfone product has less than about 5 mol % of structural units, alternatively less than about 3 mol % structural units, or alternatively less than about 1 mol % structural units derived from monomers and/or endcappers containing benzylic protons. In an embodiment, the polyetherimide and/or polyetherimide sulfone can have 0 ppm, based on parts by weight of the polymer, as determined by proton nuclear magnetic resonance spectroscopy or 0 mol % of structural units derived from monomers and/or endcappers containing benzylic protons. In an embodiment, the polyetherimide and/or polyetherimide sulfone excludes benzylic protons.

In an embodiment, the polyetherimide and/or polyetherimide sulfone can have a bromine or chlorine content of equal to or less than about 1,000 ppm, alternatively from about 0 ppm to about 1,000 ppm, or alternatively from about 0 ppm to about 500 ppm, based on parts by weight of the polyetherimide and/or polyetherimide sulfone. The amount of bromine or chlorine can be determined by ordinary chemical analysis such as atomic absorption. In an embodiment, the polyetherimide and/or polyetherimide sulfone can have a total bromine plus chlorine content of equal to or less than about 1,000 ppm, alternatively from about 0 ppm to about 1,000 ppm, or alternatively from about 0 ppm to about 500 ppm, based on parts by weight of the polyetherimide and/or polyetherimide sulfone.

In an embodiment, the polyetherimide and/or polyetherimide sulfone can have low levels of organic reaction byproducts. For example, the polyetherimide and/or polyetherimide sulfone can have a content of from about 0 ppm to about 500 ppm, alternatively from about 0 ppm to about 250 ppm, or alternatively from about 0 ppm to about 100 ppm of each of 1,3-bis(N-(4-chlorophthalimido))benzene, 1,3-bis(N-phthalimido)benzene, meta-phenylene diamine, and bis(phthalimide), based on parts by weight of the polyetherimide and/or polyetherimide sulfone.

In an embodiment, the polyetherimide and/or polyetherimide sulfone can be characterized by a melt index of from about 0.1 grams per minute (g/min) to about 10 g/min, alternatively from about 0.5 g/min to about 9.5 g/min, or alternatively from about 1 g/min to about 9 g/min, as measured in accordance with American Society for Testing Materials (ASTM) D1238 at 340° C. to 370° C., under a load of 6.7 kilogram (kg) weight.

In an embodiment, the polyetherimide and/or polyetherimide sulfone can be characterized by an intrinsic viscosity of equal to or greater than about 0.2 deciliters per gram (dl/g), alternatively from about 0.2 dl/g to about 0.8 dl/g, alternatively from about 0.3 dl/g to about 0.75 dl/g, or alternatively from about 0.35 dl/g to about 0.7 dl/g, as measured in m-cresol at 25° C. Generally, a viscosity of a fluid represents a measure of its resistance to gradual deformation by shear stress or tensile stress. As used herein, the term "intrinsic viscosity" represents the ratio of the specific viscosity of a polymer solution of known concentration to the concentration of solute (e.g., the concentration of polymer in solution), extrapolated to zero concentration. As will be appreciated by one of skill in the art, and with the help of this disclosure, intrinsic viscosity (which is widely recognized as a standard measurement of polymer characteristics) is directly proportional to the weight average molecular weight of the polymer. The intrinsic viscosity of can be determined in accordance with ASTM 4603.

In an embodiment, the polyetherimide and/or polyetherimide sulfone can be characterized by a ratio of viscosity at 100 sec$^{-1}$ to a viscosity at 5,000 sec$^{-1}$ of less than about 11, alternatively less than about 10, alternatively less than about 9, or alternatively less than about 8, as measured by capillary rheometry at 340° C.

In an embodiment, the polyetherimide and/or polyetherimide sulfone can be characterized by a tensile modulus of equal to or greater than about 380,000 psi (2,618 MPa), alternatively from about 400,000 psi (2,756 MPa) to about 620,000 psi (4,272 MPa), alternatively from about 420,000 (2,893 MPa) to about 600,000 psi (4,134 MPa), or alternatively from about 425,000 psi (2,928 MPa) to about 580,000 psi (3,996 MPa), as determined in accordance with ASTM D638. Generally, tensile modulus, also known as elastic modulus or Young's modulus, is a measure of the stiffness of a material.

In an embodiment, the polyetherimide and/or polyetherimide sulfone can be characterized by a glass transition temperature (Tg) of equal to or greater than about 150° C., alternatively greater than about 160° C., alternatively greater than about 180° C., alternatively greater than about 200° C., alternatively from about 200° C. to about 300° C., alternatively from about 200° C. to about 290° C., or alternatively from about 200° C. to about 280° C. Generally, Tg refers to a temperature region where a polymer transitions from a hard, glassy material to a soft, rubbery material. In an embodiment, the polyetherimide and/or polyetherimide sulfone can be characterized by a single Tg (as opposed to multiple Tg values).

In an embodiment, the polyetherimide comprises a commercially available polyetherimide, such as for example ULTEM resin which includes ULTEM 1000 resin, ULTEM 1010 resin, ULTEM 9011 resin, and the like, or combinations thereof. ULTEM resin is family of amorphous thermoplastic polyetherimide resins; ULTEM 1000 resin is an amorphous, transparent polyetherimide plastic with a Tg of 217° C.; ULTEM 1010 resin (e.g., ULTEM 1010K) is a transparent, high flow PEI with a Tg of 217° C.; and ULTEM 9011 resin is a transparent, high flow PEI with a Tg of 217° C.; each of which is available from SABIC Innovative Plastics. Polyetherimide resins are further described in ASTM D5205.

In an embodiment, the polyetherimide sulfone comprises a commercially available polyetherimide sulfone, such as for example ULTEM XH6050 resin, which is a transparent, enhanced flow polyetherimide sulfone copolymer with a Tg of 247° C., and which is available from SABIC Innovative Plastics.

In an embodiment, the polyetherimide and/or polyetherimide sulfone can be present within the polymer composition for capacitor films in an amount of from about 60 weight percent (wt. %) to about 99.9 wt. %, alternatively from about 65 wt. % to about 99 wt. %, alternatively from about 70 wt. % to about 95 wt. %, alternatively from about 75 wt. % to about 85 wt. %, based on the total weight of the polymer composition for capacitor films.

In an embodiment, the polyetherimide comprises less than about 15 wt. %, alternatively less than about 10 wt. %, or alternatively less than about 5 wt. % of a polyetherimide other than the polyetherimide comprising units derived from polymerization of an amine comprising a m-phenylenediamine, a p-phenylenediamine, and the like, or combinations thereof.

In an embodiment, the polymer composition for capacitor films comprises a polyester. In an embodiment, the polyester can comprise repeating structural units as represented by Formula XII:

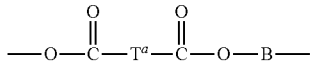

Formula XII wherein B can be a divalent group derived from a dihydroxy compound, a $C_{2-10}$ alkylene group, a $C_{6-20}$ alicyclic group, a $C_{6-20}$ aromatic group, or a polyoxyalkylene group in which the alkylene groups contain from 2 to 6 carbon atoms, or alternatively 2, 3, or 4 carbon atoms; and wherein $T_a$ can be a divalent group derived from a dicarboxylic acid, an aromatic dicarboxylic acid, a $C_{2-10}$ alkylene group, a $C_{6-20}$ alicyclic group, a $C_{6-20}$ alkyl aromatic group, or a $C_{6-20}$ aromatic group. In an embodiment, B comprises ethylene. Polyesters are described in more detail in U.S. Publication No. 20140275372 A1, which is incorporated by reference herein in its entirety.

In an embodiment, the polyester can comprise thermoplastic polyesters obtained by polymerizing dicarboxylic acids (e.g., aromatic dicarboxylic acids) and dihydroxy compounds. In an embodiment, the polyester can comprise repeating structural units derived from polymerization of an aromatic dicarboxylic acid with a dihydroxy compound. In an embodiment, the aromatic dicarboxylic acids can comprise terephthalic acid, isophthalic acid, naphthalene dicarboxylic acid, esters thereof, and the like, or combinations thereof. In an embodiment, the aromatic dicarboxylic acid comprises terephthalic acid, esters thereof, and the like, or combinations thereof. In another embodiment, the aromatic dicarboxylic acid comprises naphthalene dicarboxylic acid, esters thereof, and the like, or combinations thereof.

In some embodiments, the aromatic dicarboxylic acids can comprise aliphatic dicarboxylic acids, oxalic acid, malonic acid, adipic acid, suberic acid, azelaic acid, sebacic acid, decane dicarboxylic acid, cyclohexane dicarboxylic acid, esters thereof, and the like, or combinations thereof.

In an embodiment, the dihydroxy compounds can comprise straight chain aliphatic and cycloaliphatic diols having from 2 to 15 carbon atoms, ethylene glycol, propylene glycol, 1,4-butanediol, trimethylene glycol, tetramethylene glycol, neopentyl glycol, diethylene glycol, cyclohexane dimethanol, heptane-1,7-diol, octane-1,8-diol, neopentyl glycol, decane-1,10-diol; polyethylene glycol; bivalent phenols, dihydroxydiarylalkanes, 2,2-bis(4-hydroxylphenyl)propane (bisphenol-A or BPA), bis(4-hydroxyphenyl) methane, bis(4-hydroxyphenyl)naphthylmethane, bis(4-hydroxyphenyl)phenylmethane, bis(4-hydroxyphenyl)-(4-isopropylphenyl)methane, bis(3,5-dichloro-4-hydroxyphenyl)methane, bis(3,5-dimethyl-4-hydroxyphenyl)methane, 1,1-bis(4-hydroxyphenyl)ethane, 1-naphthyl-1,1-bis(4-hydroxyphenyl)ethane, 1-phenyl-1,1-bis(4-hydroxyphenyl)ethane, 1,2-bis(4-hydroxyphenyl)ethane, 2-methyl-1,1-bis(4-hydroxyphenyl)propane, 2,2-bis(3,5-dimethyl-4-hydroxyphenyl)propane, 1-ethyl-1,1-bis(4-hydroxyphenyl)propane, 2,2-bis(3,5-dichloro-4-hydroxyphenyl)propane, 2,2-bis(3,5-dibromo-4-hydroxyphenyl)propane, 2,2-bis(3-chloro-4-hydroxyphenyl)propane, 2,2-bis(3-methyl-4-hydroxyphenyl)propane, 2,2-bis(3-fluoro-4-hydroxyphenyl)propane, 1,1-bis(4-hydroxyphenyl)butane, 2,2-bis(4-hydroxyphenyl)butane, 1,4-bis(4-hydroxyphenyl)butane, 2,2-bis(4-hydroxyphenyl)pentane, 4-methyl-2,2-bis(4-hydroxyphenyl)pentane, 2,2-bis(4-hydroxyphenyl)hexane, 4,4-bis(4-hydroxyphenyl)heptane, 2,2-bis(4-hydroxyphenyl)nonane, 1,10-bis(4-hydroxyphenyl)decane, 1,1-bis(4-hydroxyphenyl)-3,3,5-trimethyl-cyclohexane, and 2,2-bis(4-hydroxyphenyl)-1,1,1,3,3,3-hexafluoropropane; dihyroxydiarylcycloalkanes, 1,1-bis(4-hydroxyphenyl)cyclohexane, 1,1-bis(3,5-dichloro-4-hydroxyphenyl)cyclohexane, 1,1-bis(4-hydroxyphenyl)cyclodecane; dihydroxydiarylsulfones, bis(4-hydroxyphenyl)sulfone, bis(3,5-dimethyl-4-hydroxyphenyl)sulfone, bis(3-chloro-4-hydroxyphenyl)sulfone; dihydroxydiarylethers bis(4-hydroxyphenyl)ether, bis(3-5-dimethyl-4-hydroxyphenyl)ether; dihydroxydiaryl ketones, 4,4'-dihydroxybenzophenone, 3,3',5,5'-tetramethyl-4,4-dihydroxybenzophenone; dihydroxydiaryl sulfides, bis(4-hydroxyphenyl)sulfide, bis(3-methyl-4-hydroxyphenyl)sulfide, bis(3,5-dimethyl-4-hydroxyphenyl)sulfide; dihydroxydiaryl sulfoxides, bis(4-hydroxyphenyl)sulfoxide; dihydroxydiphenyls, 4,4'-dihydroxyphenyl; dihydroxyarylfluorenes, 9,9-bis(4-hydroxyphenyl)fluorene; dihydroxybenzenes, hydroxyquinone, resorcinol, methylhydroxyquinone; dihydroxynaphthalenes, 1,5-dihydroxynaphthalene 2,6-dihydroxynaphthalene; and the like; or combinations thereof.

In an embodiment, the polyester comprises polyethylene terephthalate (poly(ethylene terephthalate) or PET), poly(1,4-butylene terephthalate) (PBT), polyethylene naphthalate (poly(ethylene naphthalate) or PEN), poly(butylene naphthalate) (PBN), poly(1,3-propylene terephthalate) (PPT), poly(cyclohexylenedimethylene terephthalate) (PCT), polytrimethylene terephthalate (PTT), poly(1,4-butylene succinate) (PBS), glycol modified polyethylene terephthalate (PETG), glycol modified polycyclohexylenedimethylene terephthalate (PCTG), poly(1,4-cyclohexylenedimethylene 1,4-cyclohexanedicarboxylate) (PCCD), poly(cyclohexanedimethanol terephthalate), poly(cyclohexanedimethanol-co-ethylene terephthalate), copolymers thereof, and the like, or combinations thereof. In one embodiment, the polyester comprises PET, PEN, PBT, PETG, PCT, copolymers thereof, and the like, or combinations thereof.

In an embodiment, PET can comprise repeating structural units as represented by Formula XIII:

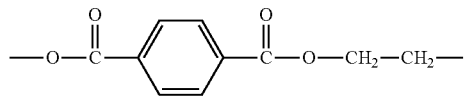

Formula XIII

In an embodiment, the repeating structural units represented by Formula XII, wherein $T^a$ is p-phenylene, and wherein B is ethylene, comprise structural units represented by Formula XIII.

In an embodiment, PEN can comprise repeating structural units as represented by Formula XIV:

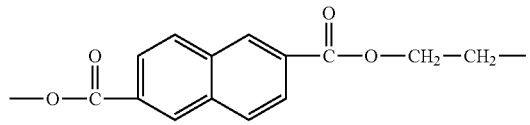

Formula XIV

In an embodiment, the repeating structural units represented by Formula XII, wherein $T^a$ is 2,6-naphthalene, and wherein B is ethylene, comprise structural units represented by Formula XIV.

In an embodiment, the polyester comprises polyethylene terephthalate. Polyethylene terephthalate is described in more detail in U.S. Pat. No. 8,546,516, which is incorporated by reference herein in its entirety.

In an embodiment, the polyethylene terephthalate comprises a low intrinsic viscosity polyethylene terephthalate, wherein the polyethylene terephthalate can have (i) a diethylene glycol derived content of from about 0.1 wt. % to about 4 wt. %, based on the total weight of the polyethylene terephthalate, (ii) an intrinsic viscosity of from about 0.1 deciliters/gram (dl/g) to about 0.83 dl/g, and (iii) a carboxylic acid end groups content in an amount of from about 10 milliequivalents/kilogram (meq/kg; milliequivalents of carboxylic acid end groups per kilogram of polyethylene terephthalate) to about 150 meq/kg.

As used herein with respect to the diethylene glycol derived content, "diethylene" refers to groups represented by formula —$(C_2H_4)O(C_2H_4)$— that are incorporated into the polyethylene terephthalate polymer by reaction of diethylene glycol with terephthalic acid or an ester of terephthalic acid, such as dimethyl terephthalate. In an embodiment, the polyethylene terephthalate can have a diethylene glycol content of from about 0.1 wt. % to about 4 wt. %, alternatively from about 0.1 wt. % to about 2 wt. %, or alternatively from about 0.1 wt. % to about 1 wt. %, based on the total weight of the polyethylene terephthalate.

In an embodiment, the polyethylene terephthalate can have an intrinsic viscosity (IV) of from about 0.1 dl/g to about 0.83 dl/g, alternatively from about 0.2 dl/g to about 0.65 dl/g, or alternatively from about 0.5 dl/g to about 0.60 dl/g. Generally, a viscosity of a fluid represents a measure of its resistance to gradual deformation by shear stress or tensile stress. As used herein, the term "intrinsic viscosity" represents the ratio of the specific viscosity of a polymer solution of known concentration to the concentration of solute (e.g., the concentration of polymer in solution), extrapolated to zero concentration. As will be appreciated by one of skill in the art, and with the help of this disclosure, intrinsic viscosity (which is widely recognized as a standard measurement of polymer characteristics) is directly proportional to the weight average molecular weight of the polymer. The intrinsic viscosity of polyethylene terephthalate can be determined by dissolving the polyethylene terephthalate in a 60:40 phenol:1,1,2,2-tetrachloroethane (TCE) solution in accordance with ASTM D4603. For purposes of the disclosure herein, a polyethylene terephthalate that has an intrinsic viscosity of less than about 0.83 dl/g will be referred to as "low intrinsic viscosity polyethylene terephthalate" ("low IV PET"), and a polyethylene terephthalate that has an intrinsic viscosity of equal to or greater than about 0.83 dl/g will be referred to as "high intrinsic viscosity polyethylene terephthalate" ("high IV PET").

In an embodiment, the polyethylene terephthalate can have a carboxylic acid end groups content in an amount of from about 10 meq/kg to about 150 meq/kg, alternatively from about 10 meq/kg to about 100 meq/kg, or alternatively from about 20 meq/kg to about 50 meq/kg. As will be appreciated by one of skill in the art, and with the help of this disclosure, methods for modifying the number of carboxylic acid end groups depend on the methods used to manufacture the polyethylene terephthalate.

In an embodiment, the polyesters (e.g., PET, low IV PET, etc.) can be manufactured by any suitable methodology.

In an embodiment, polyethylene terephthalate having a low diethylene glycol derived content (e.g., from about 0.1 wt. % to about 4 wt. %, based on the total weight of the polyethylene terephthalate) can be prepared by transesterification of a dialkyl terephthalate (e.g., dimethyl terephthalate (DMT)) and ethylene glycol in the presence of a manganese, zinc, titanium, antimony or lithium catalyst to form a transesterification product that is a mixture of low molecular weight esters with a degree of polymerization of 1, 2, or 3, in which most of the end groups are glycoxyl. In such embodiment, the transesterification product can then be further polymerized to a high molecular weight polymer in the presence of a catalyst. The IV can be modulated by adjusting the degree of polymerization of the final product, for example. To obtain the desired level of carboxylic acid end groups, for example, one process for the preparation of linear polyethylene terephthalate comprises reacting terephthalic acid with an excess of an ethylene glycol under conditions effective to reach a clearing point of the reaction; pre-polymerizing the cleared reaction mixture under conditions effective to produce oligomers having an IV measured in 60:40 phenol:1,1,2,2-tetrachloroethane by weight at 25° C. in accordance with ASTM D4603 of less than about 0.7 dl/g and a carboxylic acid end groups number of less than about 100 meq/kg; and polycondensing the oligomers under conditions effective to produce linear poly(alkylene terephthalate) resins (e.g, low IV PET) having an intrinsic viscosity measured in 60:40 phenol:1,1,2,2-tetrachloroethane by weight at 25° C. in accordance with ASTM D4603 of from about 0.4 dl/g to about 0.83 dl/g and a carboxylic acid end groups number of from about 10 meq/kg to about 100 meq/kg.

In an embodiment, the polyethylene terephthalate can be derived from a recycled PET. Nonlimiting examples of recycled PET suitable for use in the present disclosure include post-consumer waste PET, scrap PET, such as for example PET trimmed from molded articles, PET flakes, PET film, PET fiber, PET articles rejected due to quality imperfections, and the like or combinations thereof. The recycled PET can be added to a process lines making the PET, or can be used in regrind form as 100% recycled/scrap material, or mixed with virgin PET. In some embodiments, the recycled PET can be colorless with a yellowness index (YI) of less than about 5. Generally, YI is a number calculated from spectrophotometric data that describes the change in color of a test sample from clear or white to yellow. In an embodiment, the recycled PET has less than about 0.1 wt. % of polyvinyl chloride (PVC), based on the total weight of the recycled PET.

As will be appreciated by one of skill in the art, and with the help of this disclosure, the polyethylene terephthalate polymer can contain other polyester units, e.g., units derived from other diols (e.g., diols other than ethylene glycol), for example aliphatic diols.

In an embodiment, the polyethylene terephthalate contains groups derived from a diol other than ethylene glycol, such as for example aliphatic diols, 2-propanediol, 1,3-propanediol, 1,2-butanediol, 1,3-butanediol, 1,4-butanediol, 2,3-butanediol, diethylene glycol, 1,5-pentanediol, neopentyl glycol, triethylene glycol, poly(ethylene glycol); aliphatic polyhydric alcohols, trimethylolpropane, pentaerythritol; alicyclic diols, 1,4-cyclohexanedimethanol, 1,4-cyclohexanediethanol; and the like; or combinations thereof.

In an embodiment, the polyethylene terephthalate contains groups derived from a diol other than ethylene glycol in an amount of less than about 20 wt. %, alternatively less than about 10 wt. %, alternatively less than about 5 wt. %, or alternatively less than about 1 wt. %, based on the total weight of the polyethylene terephthalate. In an embodiment, the polyethylene terephthalate contains groups derived from 1,4-cyclohexanedimethanol in an amount of less than about 1 wt. %, based on the total weight of the polyethylene terephthalate.

In an embodiment, the polyethylene terephthalate can be linear, wherein the polyethylene terephthalate can comprise less than about 3 wt. %, alternatively less than about 2 wt. %, alternatively less than about 1 wt. % cyclic polyester, based on the total weight of the polyethylene terephthalate, as determined by proton nuclear magnetic resonance spectroscopy. In an embodiment, the polyethylene terephthalate can comprise no cyclic polyester, based on the total weight of the polyethylene terephthalate, as determined by proton nuclear magnetic resonance spectroscopy.

In an embodiment, the polyethylene terephthalate contains groups derived from an aromatic dicarboxylic acid other than terephthalic acid, such as for example isophthalic acid, 5-sulfoisophthalic acid (sodium salt), 2,6-naphthalenedicarboxylic acid, 4,4'-diphenyldicarboxylic acid, diphenylsulfo-dicarboxylic acid, trimellitic acid, pyromellitic acid, oxalic acid, succinic acid, adipic acid, sebacic acid, azelaic acid, decanedicarboxylic acid, salts thereof, esters thereof, anhydrides thereof, and the like, or combinations thereof.

In an embodiment, the polyethylene terephthalate contains groups derived from an aromatic dicarboxylic acid other than terephthalic acid in an amount of less than about 20 wt. %, alternatively less than about 10 wt. %, alternatively less than about 5 wt. %, or alternatively less than about 1 wt. %, based on the total weight of the polyethylene terephthalate. In an embodiment, the polyethylene terephthalate contains groups derived from isophthalic acid in an amount of less than about 5 wt. %, based on the total weight of the polyethylene terephthalate.

In an embodiment, the polyethylene terephthalate contains groups derived from 1,4-cyclohexanedimethanol in an amount of less than about 1 wt. %, based on the total weight of the polyethylene terephthalate, and groups derived from isophthalic acid in an amount of less than about 5 wt. %, based on the total weight of the polyethylene terephthalate.

In an embodiment, the low IV PET can be characterized by a Mw of equal to or greater than about 25,000 Da, alternatively from about 25,000 Da to about 75,000 Da, or alternatively from about 45,000 Da to about 60,000 Da.

In an embodiment, the low IV PET can be characterized by a melting point of from about 240° C. to about 260° C., alternatively from about 245° C. to about 255° C., or alternatively from about 255° C. to about 260° C., as determined in accordance with ASTM D3418 by differential scanning calorimetry (DSC) with a heating rate of 10° C./min.

In an embodiment, the low IV PET can be characterized by a single glass transition temperature (Tg) of from about 70° C. to about 90° C., alternatively from about 80° C. to about 85° C., or alternatively from about 81° C. to about 83° C.

In an embodiment, the polyesters can be characterized by a melt volume rate of from about 5 cubic centimeters (cc) per 10 minutes (cc/10 min) to about 150 cc/10 min, alternatively from about 7 cc/10 min to about 125 cc/10 min, alternatively from about 9 cc/10 min to about 110 cc/10 min, or alternatively from about 10 cc/10 min to about 100 cc/10 min, as measured in accordance with ASTM D1238 at 265° C., under a load of 5 kg weight.

In an embodiment, the polyester comprises a commercially available polyester, such as for example LASER+ C (C61A) polyethylene terephthalate resin, which is a medium IV product available from DAK Americas; a low IV PET under the trade designation "5F0441RP," which is available from Akra Polyesters S.A. de C.V.; TRITAN TX2001, a copolyester which is available from Eastman Chemical Company; and KALADEX ES366300, a PEN polymer, which is available from Goodfellow; and the like; or combinations thereof.

In an embodiment, the polyester can be present within the polymer composition for capacitor films in an amount of from about 0.1 weight percent (wt. %) to about 40 wt. %, alternatively from about 1 wt. % to about 35 wt. %, alternatively from about 5 wt. % to about 30 wt. %, or alternatively from about 15 wt. % to about 25 wt. %, based on the total weight of the polymer composition for capacitor films.

In an embodiment, the polymer composition for capacitor films can further comprise additives to improve one or more properties of the polymer composition, such as for example stabilizers (e.g., antioxidants), thermal stabilizers, light stabilizers, ultraviolet light (UV) absorbing additives, quenchers, plasticizers, lubricants, lubricating oils, antistatic agents, flame retardants, anti-drip agents, radiation stabilizers, fluoropolymers, pigments, dyes, particulate fillers, glass, carbon fiber, mica, talc, additional polymers (e.g., amorphous polymers), polyethylene, high density polyethylene (HDPE), fatty acids, siloxanes, wax, and the like, or combinations thereof. In such embodiment, the additives can be selected so as to not provide more than about 10 wt. % of fluorine, not provide more than about 1,000 ppm of a silicone by weight of the composition, or otherwise do not significantly adversely affect the desired properties of the polymer compositions. In an embodiment, the additives can be present in a polymer composition for capacitor films in an amount that provides less than about 1,000 ppm of a compound having a molecular weight of less than about 250 Da.

In some embodiments, the polymer composition for capacitor films can comprise antioxidants, such as for example phosphorus-containing stabilizers, organophosphorous compounds, difunctional phosphorus containing compounds, phosphites, triaryl phosphites, phosphonites, aryl phosphonates, hindered phenols, and the like, or combinations thereof. In other embodiments, the polymer composition for capacitor films excludes stabilizers, for example phosphorous-containing stabilizers. In an embodiment, the phosphorus-containing stabilizers can be characterized by a weight average molecular weight of equal to or greater than about 300 Da.

In an embodiment, the polymer composition for capacitor films can comprise more than one phosphorus-containing stabilizer. In such embodiment, the phosphorus-containing stabilizer can be of the same type or different types. For example, the polymer composition for capacitor films can comprise two phosphites or a phosphite and a phosphonite.

Nonlimiting examples of phosphites and phosphonites suitable for use in the present disclosure include triphenyl phosphite, diphenyl alkyl phosphites, phenyl dialkyl phosphites, tris(nonylphenyl)phosphite, trilauryl phosphite, tri-octadecyl phosphite, distearyl pentaerythritol diphosphite, tris(2,4-di-tert-butylphenyl)phosphite, diisodecyl pentaerythritol diphosphite, bis(2,4-di-tert-butylphenyl) pentaerythritol diphosphite, bis(2,6-di-tert-butyl-4-methylphenyl)-pentaerythritoldiphosphite, diisodecyloxy pentaerythritol diphosphite, bis(2,4-di-tert-butyl-6-methylphenyl)pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, bis(2,4-di-tert-butyl-6-methylphenyl)methyl phosphite, bis(2,4-di-tert-butyl-6-methylphenyl)ethyl phosphite, 2,2',2''-nitrilo[triethyl tris(3,3',5,5'-tetra-tert-butyl-1,1'-biphenyl-2,2'-diyl)phosphite], 2-ethylhexyl(3,3',5,5'-tetra-tert-butyl-1,1'-biphenyl-2,2'-diyl)phosphite, 5-butyl-5-ethyl-2-(2,4,6-tri-tert-butylphenoxy)-1,3,2-dioxaphosphirane, tetrakis(2,4-di-tert-butylphenyl)-4,4'-biphenyldiphosphonite, tris(2,4-di-tert-butylphenyl) phosphite (PEPQ), and the like, or combinations thereof.

In an embodiment, the phosphorus-containing stabilizers can be present in the polymer composition for capacitor films in an amount from about 0.005 wt. % to about 3 wt. %, or alternatively from about 0.01 wt. % to about 1.0 wt. %, based on total weight of the composition.

In an embodiment, the phosphorus-containing stabilizers can be present in the polymer composition for capacitor films in an amount from about 0 wt. % to about 2 wt. %, alternatively from about 0 wt. % to about 1.0 wt. %, or alternatively from about 0.5 wt. % to about 1.0 wt. %, based on total weight of the composition, wherein the phosphorus-containing stabilizers can be characterized by a weight average molecular weight of equal to or greater than about 500 Da.

In an embodiment, the phosphorus-containing stabilizers comprise IRGAPHOS 168, which is tris-di-tert-butylphenyl phosphite commercially available from Ciba Chemical Co. In an embodiment, the phosphorus-containing stabilizers comprise DOVERPHOS S-9228, which is commercially available from Dover Chemical Co.

In an embodiment, the antioxidant comprises a hindered phenol, such as for example alkylated monophenols, alkylated bisphenols, poly phenols, and the like, or combinations thereof.

Nonlimiting examples of alkylated monophenols suitable for use in the present disclosure include 2,6-di-tert-butyl-4-methylphenol; 2-tert-butyl-4,6-dimethylphenol; 2,6-di-tert-butyl-4-ethylphenol; 2,6-di-tert-butyl-4-n-butylphenol; 2,6-di-tert-butyl-4-isobutylphenol; 2,6-dicyclopentyl-4-methylphenol; 2-(alpha-methylcyclohexyl)-4,6-dimethylphenol; 2,6-dioctadecyl-4-methylphenol; 2,4,6-tricyclohexylphenol; 2,6-di-tert-butyl-4-methoxymethylphenol; nonyl phenols which are linear or branched in the side chains; 2,6-di-nonyl-4-methylphenol; 2,4-dimethyl-6-(1'-methylundec-1'-yl)phenol; 2,4-dimethyl-6-(1'-methylheptadec-1'-yl)phenol; 2,4-dimethyl-6-(1'-methyltridec-1'-yl)phenol; and the like; or combinations thereof.

Nonlimiting examples of alkylidene bisphenols suitable for use in the present disclosure include 2,2'-methylenebis (6-tert-butyl-4-methylphenol), 2,2'-methylenebis(6-tert-butyl-4-ethylphenol), 2,2'-methylenebis[4-methyl-6-(alpha-methylcyclohexyl)-phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(alpha-methylbenzyl)-4-nonylphenol], 2,2'-methylenebis[6-(alpha, alpha-dimethylbenzyl)-4-nonylphenol], 4,4'-methylenebis-(2,6-di-tert-butylphenol), 4,4'-methylenebis (6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl)butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis-(3,5-di-tert-butyl-4-hydroxyphenyl)propane, 2,2-bis-(5-tert-butyl-4-hydroxy-2-methylphenyl)-4-n-dodecylmercaptobutane, 1,1,5,5-tetra-(5-tert-butyl-4-hydroxy-2-methylphenyl)-pentane, and the like, or combinations thereof.

In an embodiment, the hindered phenol can be characterized by a molecular weight of equal to or greater than about 300 Da. In such embodiment, the molecular weight of the hindered phenol can help retain the hindered phenol moiety in a polymer melt at high processing temperatures, such as for example a temperature of equal to or greater than about 300° C.

In an embodiment, the hindered phenol can be present in the polymer composition for capacitor films in an amount from about 0.005 wt. % to about 2 wt. %, or alternatively from about 0.01 wt. % to about 1.0 wt. %, based on total weight of the composition.

In some embodiments, the polymer composition for capacitor films can comprise one or more particulate fillers to adjust the properties of the composition, for example dielectric constant, coefficient of thermal expansion, and the like. In other embodiments, the polymer composition for capacitor films excludes particulate fillers.

Nonlimiting examples of particulate fillers suitable for use in the present disclosure include silica powder, fused silica, crystalline silica; boron-nitride powders, boron-silicate powders; alumina, magnesium oxide (magnesia); silicate spheres; flue dust; cenospheres; aluminosilicate (armospheres); natural silica sand; quartz; quartzite; titanium oxide, barium titanate, barium strontium, tantalum pentoxide, tripoli; diatomaceous earth; synthetic silica; and the like; or combinations thereof. In an embodiment, the particulate fillers can be surface treated with silanes to improve adhesion and dispersion with a polymeric composition.

In an embodiment, the particulate fillers can be present in the polymer composition for capacitor films in an amount effective to provide desired physical properties. In an embodiment, the particulate fillers can be present in the polymer composition for capacitor films in an amount of from about 0.1 vol. % to about 50 vol. %, alternatively from about 0.1 vol. % to about 40 vol. %, alternatively from about 5 vol. % to about 30 vol. %, alternatively from about 5 vol. % to about 20 vol. %, based on total volume of the composition.

In some embodiments, the polymer composition for capacitor films can further comprise at least one additional polymer, wherein the additional polymers are selected so as to not provide more than about 10 wt. %, based on total weight of the composition, of fluorine or silicon, or otherwise not significantly adversely affect desired properties of the compositions.

Nonlimiting examples of additional amorphous polymers suitable for use in the present disclosure include poly(phenylene sulfone)s, poly(sulfone)s, poly(ether sulfone)s, poly(arylene sulfone), poly(phenylene ether)s, polycarbonates, polyetherimide siloxane, and the like, blends thereof, copolymers thereof, or combinations thereof.

In an embodiment, the additional polymer can be present in the polymer composition for capacitor films in an amount from about 0 wt. % to about 12 wt. %, alternatively from about 0.1 wt. % to about 10 wt. %, or alternatively from about 0.5 wt. % to about 5 wt. %, based on total weight of the composition.

In some embodiments, the polymer composition for capacitor films can further comprise fluoropolymers, such as for example fluorinated ethylene propylene (FEP), polytetrafluoroethylene (PTFE), and perfluoroalkoxy polymer (PFA) for compositions intended for use at temperature applications exceeding about 200° C.; and polyvinylidene fluoride (PVDF), polyvinyl fluoride (PVF), and poly(ethene-co-tetrafluoroethene) (ETFE) as fillers to lower a coefficient of friction and to improve slip and to aid in processing of the capacitor films intended for use at temperature applications below about 200° C.

In an embodiment, the additives (except any fillers) can be present in the polymer composition for capacitor films in an amount from about 0.005 wt. % to about 20 wt. %, or alternatively from about 0.01 wt. % to about 10 wt. %, based on total weight of the composition.

In an embodiment, the polyetherimide and/or the polyetherimide sulfone, and the polyester, as well as any optional additives, can be combined (e.g., contacted, blended, mixed etc.) to yield polymer composition for capacitor films by using any suitable mixing means. In an embodiment, the polyetherimide and/or the polyetherimide sulfone, and the polyester, as well as any optional additives, can be combined under conditions for the formation of an intimate blend, wherein such conditions can include melt mixing in single or twin screw type extruders, mixing bowl, or similar mixing or blending devices that can apply shear to the components being combined together. In some embodiments, twin-screw extruders can be preferred due to their more intensive mixing capability and self-wiping capability, over single screw extruders.

In an embodiment, it can be advantageous to apply a vacuum to the blending composition through at least one vent port in the extruder to remove volatile impurities in the composition. In an embodiment, it can be advantageous to dry (e.g., free from as much water as possible) the polyetherimide and/or the polyetherimide sulfone, and the polyester, as well as any optional additives, prior to melting.

In an embodiment, melt processing of the polymer composition for capacitor films can be done at a temperature of from about 290° C. to about 360° C. to avoid excessive polymer degradation, while still allowing sufficient melting to get an intimate polymer mixture free of any unblended components. In an embodiment, compounding can be carried out to ensure that the residence time of the polymer composition in the machine is short, the temperature can be carefully controlled, and the friction heat can be utilized, such that an intimate blend between the components can be obtained.

In an embodiment, the polymer composition for capacitor films can also be melt filtered using any suitable polymer filtering device, such as for example a polymer candle filter or a screen filter with a pore size or an aperture size of from about 1 micron to about 100 microns, alternatively from about 25 microns to about 100 microns, or alternatively from about 40 microns to about 100 microns, to remove undesirable black specks or other heterogeneous contaminants, for example any particles having a diameter of greater than about 1 micron. As will be appreciated by one of skill in the art, and with the help of this disclosure, when a filtering device has a pore size or an aperture size of 1 micron for example, such filtering device retains all solid particles with a size of 1 micron or greater, and allows passage of solid particles with a size of less than 1 micron. Further, as will be appreciated by one of skill in the art, and with the help of this disclosure, the size of the solid particles that can be removed is referenced with respect to the pore size or the aperture size of the filtering device, and not with respect to a shape and associated physical dimensions of such solid particle.

In an embodiment, the polyetherimide and/or the polyetherimide sulfone, and the polyester, as well as any optional additives, can be placed into an extrusion compounder to produce a continuous strand that is cooled and then chopped into pellets (e.g., extruded pellets). In another embodiment, the polyetherimide and/or the polyetherimide sulfone, and the polyester, as well as any optional additives, can be mixed by dry blending, and then fluxed on a mill and comminuted, or extruded and chopped into pellets. In yet another embodiment, the polyetherimide and/or the polyetherimide sulfone, and the polyester, as well as any optional additives, can also be mixed and directly extruded to form a film, as will be described in more detail later herein. In still yet another embodiment, the polymer composition pellets can be melted and then extruded to form a film.

In an embodiment, the polymer composition for capacitor films comprises a miscible polymer blend, wherein the polymer composition can be characterized by a single glass transition temperature (Tg) of from about 125° C. to about 250° C., alternatively from about 130° C. to about 240° C., alternatively from about 135° C. to about 230° C., alternatively from about 150° C. to about 220° C., or alternatively from about 160° C. to about 210° C., alternatively equal to or greater than about 170° C., alternatively equal to or greater than about 180° C., alternatively equal to or greater than about 190° C., alternatively equal to or greater than about 200° C., alternatively equal to or greater than about 210° C., or alternatively equal to or greater than about 220° C., as measured by differential scanning calorimetry (DSC).

Generally, a miscible polymer blend refers to a mixture of two or more polymers wherein the mixed polymers behave as a single phase (e.g., behave as a single polymer) upon being melted together, i.e., the mixed polymers exhibit a single Tg. By contrast, an immiscible polymer blend refers to a mixture of two or more polymers wherein the mixed polymers will phase separate upon being melted together, i.e., the mixed polymers exhibit two or more Tgs. For example, in the case of two immiscible polymers, when mixed together, the polymers will phase separate, wherein the phases can be interspersed. As will be appreciated by one of skill in the art, and with the help of this disclosure, when two polymers are mixed together, there are only certain mixing ratio ranges for the two polymers where the polymers are miscible and can form a miscible polymer blend. In an embodiment, the polyetherimide and/or the polyetherimide sulfone, and polyester as disclosed herein can be mixed in a (polyetherimide and/or the polyetherimide sulfone): polyester weight ratio of from about 60:40 to about 99.9: 0.01 to form a miscible polymer blend. Further, the polyetherimide and polyetherimide sulfone as disclosed herein can be mixed in any ratio to form a miscible polymer blend.

In an embodiment, the polymer composition for capacitor films can be characterized by an extruded pellet appearance, wherein the extruded pellet appearance is transparent (e.g., clear). As will be appreciated by one of skill in the art, and with the help of this disclosure, when two transparent polymers are blended, the appearance of the resulting blend will depend on the miscibility of the polymers. Generally, when two transparent polymers are mixed and form a miscible polymer blend, the miscible polymer blend can be transparent. Further, when two transparent polymers are mixed and form an immiscible polymer blend, the immiscible polymer blend can be opaque, hazy, non-transparent, as the polymers phase separate.

In an embodiment, the polymer composition for capacitor films can be characterized by a specific gravity of from about 1.25 to about 1.35, alternatively from about 1.27 to about 1.33, or alternatively from about 1.28 to about 1.31. Generally, specific gravity represents a ratio of a density of a material to the density of water, wherein the density of the material and the density of water are measured at the same temperature. Density of polymers is generally expressed in g/cc, and it can be determined in accordance with ASTM D1505.

In an embodiment, the polyester as disclosed herein can have a relatively high specific gravity when compared to the specific gravity of polyetherimide and/or the polyetherimide sulfone, as disclosed herein. As will be appreciated by one of skill in the art, and with the help of this disclosure, the specific gravity of the polymer composition for capacitor films is greater than the specific gravity of the corresponding polyetherimide and/or the polyetherimide sulfone, by itself, which in turn reduces a free volume within the blend (e.g., the polymer composition for capacitor films) and consequently increases electrical performance. Further, as will be appreciated by one of skill in the art, and with the help of this disclosure, the free volume in materials is a known failure mechanism in dielectric films manufactured from such materials. Generally, the free volume of a material is regarded as the volume within the material in which a given molecule is free to wander.

In an embodiment, the polymer composition for capacitor films can be characterized by a ratio of viscosity at 100 sec$^{-1}$ to a viscosity at 5,000 sec$^{-1}$ of from about 1 to about 10, alternatively from about 2 to about 9, or alternatively from about 2.5 to about 8.5.

In an embodiment, the polymer composition for capacitor films can be characterized by a melt volume rate of from about 1 cubic centimeters (cc) per 10 minutes (cc/10 min) to about 40 cc/10 min, alternatively from about 2.5 cc/10 min to about 35 cc/10 min, alternatively from about 4.5 cc/10 min to about 13 cc/10 min, or alternatively from about 20 cc/10 min to about 37 cc/10 min, as measured in accordance with ASTM D1238 at 295° C. to 337° C., under a load of 6.7 kilogram (kg) weight.

In an embodiment, the polymer composition for capacitor films can be characterized by a heat distortion temperature or heat deflection temperature (HDT) of from about 100° C. to about 225° C., alternatively from about 110° C. to about 215° C., alternatively from about 115° C. to about 200° C., alternatively equal to or greater than about 150° C., alternatively equal to or greater than about 160° C., alternatively equal to or greater than about 170° C., alternatively equal to or greater than about 180° C., alternatively equal to or greater than about 190° C., or alternatively equal to or greater than about 200° C., as measured in accordance with ASTM D648 at 264 psi (1.8 Mpa) on 3.2 millimeters (mm) thick samples. HDT of a material generally refers to the temperature where the material deforms under a specified load.

In an embodiment, the polymer composition for capacitor films can be extruded using extruders conventionally used for thermoplastic compositions using a flat die. Generally, the extrusion cast film method involves melting the polymer composition in an extruder to form a molten polymer; conveying the molten polymer through a flat die of small lip gap separation to form a film (e.g., extruded film); drawing the film onto take-up rollers and stretching the film at relatively high take-up speeds; and cooling/solidification of the polymer in the film to form the final film. The extruder can be of the single- or twin-screw design, and a melt pump can also be used to provide a constant, non-pulsating flow of polymer through the die. In an embodiment, the die can be characterized by a die lip gap of from about 100 microns to about 200 microns. In an embodiment, the take-up rollers can operate at a speed (e.g., take-up speed) of up to about 200 m/min. The capacitor film can be extruded through a flat die, and as the film is drawn onto the take-up rollers, the film can be stretched in the direction of film movement (e.g., uniaxially stretched) to form a uniaxially stretched capacitor film. In an embodiment, a design of the extruder can also include the addition of a heated roll to temper/anneal the film and thus minimize the occurrence of frozen-in internal stresses. The edges of the film can be trimmed, and the film can be wound up on a roll using a tension-controlled winding mechanism.

In some embodiments, commercial and/or experimentally functionalized fillers can be uniformly dispersed in the polymer composition (e.g., compounded into the polymer composition) to form a composite material, prior to stretching the composite material into a thin film. In such embodiments, compounding of the filler into the polymer composition to obtain a uniform dispersion can be done on a separate extruder, or alternatively on the same extruder used to effect the melting of the polymer prior to stretching the film. In an embodiment, compounding of the filler into the polymer composition can be done on the same extruder used to melt the polymer prior to stretching the film. As will be appreciated by one of skill in the art, and with the help of this disclosure, accuracy of delivering a constant and uniform flow of molten polymer through the die; rheological properties of the polymer used to make the film; the cleanliness of both polymer composition and equipment; and mechanical characteristics of the take-up mechanism will all contribute to a successful preparation of extruded films having relatively small thicknesses (e.g., less than about 20 microns).

In an embodiment, the extrusion cast film method can be a one-step process, can be scalable to larger size equipment, and does not require the use of any solvent. Even for the case of polymers of relatively high molecular weight and/or high glass transition temperature, this extrusion process (e.g., extrusion cast film method) can be properly designed to provide an environment for the polymer that does not lead to excessive temperatures that can cause the thermal or mechanical degradation of the polymer composition. In an embodiment, using a filtration device for the molten polymer can produce a film that is virtually free of contaminants, such as gels and black specks, which could damage the dielectric performance of resulting films if not properly removed from the molten polymer. In an embodiment, the films produced by the extrusion cast film method can be thin films (e.g., less than about 50 micron in thickness, and even thinner); of uniform thickness across the width of the film; flat with almost no wrinkles or surface waviness (e.g., smooth, wrinkle-free, etc.); and relatively free of contamination.

In an embodiment, the molten polymer can be conveyed through the flat die using a melt pump. In an embodiment, the film can be extruded at a temperature of from about 250° C. to about 500° C., or alternatively from about 300° C. to about 450° C. In an embodiment, the extruded film can be uniaxially stretched to produce a dielectric substrate film.

In an embodiment, forming a capacitor film comprises combining, melting and intimately mixing components of the polymer composition for capacitor films to form a molten polymer, filtering the molten polymer to remove particles greater than about 1 micrometer to form a filtered molten polymer; extruding the filtered molten polymer through a flat die at a temperature of from about 250° C. to about 500° C., alternatively from about 275° C. to about 400° C., or alternatively from about 300° C. to about 450° C. to form an extruded film; and uniaxially stretching the extruded film to form a dielectric substrate film (e.g., a capacitor film; a uniaxially stretched capacitor film). After stretching, the capacitor film can be metallized as will be described in more detail later herein, or wound on a take-up roll for storage or shipping. As will be appreciated by one of skill in the art, and with the help of this disclosure, the composition and manufacturing method of the capacitor films can be varied to achieve desired performance properties, in particular electrical properties.

In an embodiment, the capacitor film can have a film length of equal to or greater than about 10 meters, alternatively greater than about 100 meters, or alternatively greater than about 10,000 meters. In an embodiment, the capacitor film can have a film width of equal to or greater than about 300 mm, alternatively greater than about 300 mm, or alternatively greater than about 3,000 mm.

As will be appreciated by one of skill in the art, and with the help of this disclosure, the rate at which the film can be extruded can vary. In an embodiment, a rate at which the capacitor film can be extruded can be from about 10 lbs/hr (4.5 kg/hr) to about 1000 lbs/hr (500 kg/hr).

In an embodiment, the take-up speed (e.g., the rate at which the capacitor film can pulled from a die plate of the extruder) can range from about 10 meters/minute (m/min) to about 300 m/min, alternatively from about 50 m/min to about 275 m/min, or alternatively from about 100 m/min to about 250 m/min.

In an embodiment, the capacitor film comprises a high yield extruded film, wherein the capacitor film (e.g., high yield extruded capacitor film) comprises equal to or greater than about 90 wt. %, alternatively greater than about 92 wt. %, alternatively greater than about 94 wt. %, alternatively greater than about 96 wt. %, or alternatively greater than about 98 wt. % of the miscible polymer blend entering an extruder used for manufacturing the capacitor film, e.g., of the polyetherimide and/or the polyetherimide sulfone, and the polyester present in the polymer composition for capacitor films prior to extrusion, based on the total weight of miscible polymer blend (e.g., the total weight of polyetherimide and/or the polyetherimide sulfone, and the polyester present in the polymer composition for capacitor films) prior to entering the extruder. In an embodiment, the capacitor film comprises a uniaxially stretched, high yield extruded capacitor film.

In an embodiment, the capacitor films have two sides (e.g., two opposing sides), such as for example a first film side and a second film side. In an embodiment, at least one side of the capacitor films (e.g., a first film side, a second film side) can be metallized, wherein a metal layer can be deposited on at least a portion of the film to yield a metallized capacitor film. In an embodiment, the capacitor film can be metallized at least on one portion of at least one side of the capacitor film (e.g., a first film side, a second film side), wherein the at least one side of the capacitor film can be a smooth side. Generally, a smooth side of a capacitor film refers to a side having a surface roughness average (Ra) of less than about +/−3% as determined by optical profilometry, as will be described in more detail later herein.

As will be appreciated by one of skill in the art, and with the help of this disclosure, a variety of metals can be used for metallizing the capacitor film, depending on the intended use of the film. Nonlimiting examples of metals (e.g., conductive metals) suitable for use in the present disclosure include copper, aluminum, silver, gold, nickel, zinc, titanium, chromium, vanadium, tantalum, niobium, brass, and the like, or combinations thereof.

In an embodiment, methods for the metallization of capacitor films comprising a polymer composition comprise vacuum metal vapor deposition, high temperature vacuum deposition, chemical vapor deposition, atomic layer deposition, metal sputtering, plasma treatments, electron beam treatments, chemical oxidation or reduction reactions, electroless wet-chemical deposition, and the like, or combinations thereof. In an embodiment, the capacitor films can be metallized on both sides by electroless plating. In another embodiment, a patterned metal layer can be formed on a surface of the capacitor film, for example by ink jet printing.

As will be appreciated by one of skill in the art, and with the help of this disclosure, a thickness of the metal layer is determined by the intended use of the metallized film. In an embodiment, the metal layer deposited on the capacitor films can be characterized by a metal layer thickness of from about 1 Angstrom to about 1,000 nanometers, alternatively from about 1 Angstrom to about 500 nanometers, alternatively from about 1 Angstrom to about 10 nanometers, alternatively from about 1 Angstrom to about 3,000 Angstroms, alternatively from about 1 Angstrom to about 2,820 Angstroms, alternatively from about 1 Angstrom to about 2,000 Angstroms, or alternatively from about 1 Angstrom to about 1,000 Angstroms.

In an embodiment, the metal layer deposited on the capacitor films comprises a conductive metal. In such embodiment, the metal layer can be characterized by a metal layer resistivity of from about 0.1 to about 1,000 Ohms per square, alternatively from about 0.1 to about 500 Ohms per square, or alternatively from about 0.1 to about 100 Ohms per square, as measured in accordance with ASTM D257.

In an embodiment, the surface of the capacitor film to be metallized can be pre-treated, for example to enhance adhesion of the metal layer. Nonlimiting examples of film pre-treatment methods suitable for use in the present disclosure include washing, flame treatment, plasma discharge, corona discharge, and the like, or combinations thereof.

In an embodiment, one or more additional layers can be deposited on the metal layer, for example a clear coat (e.g., a poly(methyl methacrylate) and/or poly(ethyl methacrylate) to provide scratch resistance) and/or another layer of polymer composition (e.g., polyetherimide, polyetherimide sulfone, polyester, or combinations thereof) film to form a laminate.

In an embodiment, the capacitor films can be characterized by a Tg (e.g., a single Tg) of from about 125° C. to about 250° C., alternatively from about 130° C. to about 240° C., alternatively from about 135° C. to about 230° C., alternatively from about 150° C. to about 220° C., alternatively from about 160° C. to about 210° C., alternatively equal to or greater than about 170° C., alternatively equal to or greater than about 180° C., alternatively equal to or greater than about 190° C., alternatively equal to or greater than about 200° C., alternatively equal to or greater than about 210° C., or alternatively equal to or greater than about 220° C., as measured by differential scanning calorimetry (DSC).

In an embodiment, the polyetherimide and/or the polyetherimide sulfone, and the polyester can each be present in the polymer composition for capacitor films (e.g., the miscible polymer blend) in an amount effective to provide for a single glass transition temperature of the capacitor film.

In an embodiment, the capacitor films can be characterized by a film appearance, wherein the film appearance is transparent (e.g., clear). As will be appreciated by one of skill in the art, and with the help of this disclosure, when a film is prepared from a transparent miscible polymer blend, the appearance of the resulting film can be transparent. The film appearance can be assessed by visual inspection of the film surface.

In an embodiment, the polyetherimide and/or the polyetherimide sulfone, and the polyester can each present in the polymer composition for capacitor films in an amount effective to provide for a miscible polymer blend.

In an embodiment, the capacitor films can be characterized by a HDT of from about 100° C. to about 225° C., alternatively from about 110° C. to about 215° C., alternatively from about 115° C. to about 200° C., alternatively equal to or greater than about 150° C., alternatively equal to or greater than about 160° C., alternatively equal to or greater than about 170° C., alternatively equal to or greater than about 180° C., alternatively equal to or greater than about 190° C., or alternatively equal to or greater than about 200° C., as measured in accordance with ASTM D648 at 264 psi (1.8 Mpa) on 3.2 millimeters (mm) thick samples.

In an embodiment, the capacitor films (e.g., capacitor films, metallized capacitor films) can be characterized by a dissipation factor (Df) of from about 0% to about 2%, alternatively from about 0.1% to about 1.5%, alternatively from about 0.1% to about 1%, or alternatively from about 0.1% to about 0.5%, as measured by dielectric spectroscopy at 1 kHz, 23° C. and 50% relative humidity (RH). Df can also be referred to as loss factor or dielectric loss, and it generally refers to the power dissipated as heat by a dielectric. Df can be measured in accordance with ASTM D150. RH can generally be defined as the ratio of the partial pressure of water vapor to the equilibrium vapor pressure of water at a given temperature.

In an embodiment, the capacitor films (e.g., capacitor films, metallized capacitor films) can be characterized by a dissipation factor (Df) of from about 0% to about 1%, alternatively from about 0.1% to about 0.75%, or alternatively from about 0.1% to about 0.5%, as measured by dielectric spectroscopy at 1 kHz, 23° C. and 50% RH.

In an embodiment, Df of the capacitor films can remain essentially unchanged with an increased in temperature, e.g., any change in Df due to an increase or decrease in temperature does not adversely interfere with physical and/or electrical properties of a capacitor that comprises such capacitor film. In an embodiment, Df of the capacitor films remains essentially unchanged at temperatures of from about 0° C. to about 200° C., alternatively from about 0° C. to about 185° C., alternatively from about 0° C. to about 175° C., alternatively from about 0° C. to about 170° C., or alternatively from about 0° C. to about 150° C.

In an embodiment, the capacitor films (e.g., capacitor films, metallized capacitor films) can be characterized by a dielectric constant (Dk) of from about 2 to about 5, alternatively from about 3 to about 5, alternatively from about 2.5 to about 4.5, or alternatively from about 3 to about 4, as measured in accordance with ASTM D150 at 1 kHz, 23° C. and 50% RH. Generally, Dk refers to a material's ability to store a charge when used as a capacitor dielectric. Dk is a unitless value because it is measured in ratios.

In an embodiment, the capacitor films (e.g., capacitor films, metallized capacitor films) can be characterized by stable Dk values up to the Tg of the polymer composition that was used to produce the capacitor films, alternatively up to a temperature that is lower by about 10° C. than the Tg of the polymer composition that was used to produce the capacitor films, or alternatively up to a temperature that is lower by about 20° C. than the Tg of the polymer composition that was used to produce the capacitor films. In an embodiment, the capacitor films (e.g., capacitor films, metallized capacitor films) can be characterized by stable Dk values up to about 250° C., up to about 240° C., alternatively up to about 230° C., alternatively up to about 220° C., alternatively up to about 210° C., alternatively up to about 200° C., alternatively up to about 190° C., alternatively up to about 180° C., alternatively up to about 175° C., alternatively up to about 170° C., or alternatively up to about 150° C.

In an embodiment, Dk of the capacitor films can remain essentially unchanged with an increase in temperature, e.g., any change in Dk due to an increase or decrease in temperature does not adversely interfere with physical and/or electrical properties of a capacitor that comprises such capacitor film. In an embodiment, Dk of the capacitor films remains essentially unchanged at temperatures of from about 0° C. to about 200° C., alternatively from about 0° C. to about 185° C., alternatively from about 0° C. to about 175° C., alternatively from about 0° C. to about 170° C., or alternatively from about 0° C. to about 150° C. In some embodiments, Dk of the capacitor films can vary by less than about 20%, alternatively by less than about 10%, or alternatively by less than about 10%, based on the highest Dk value, within a temperature range of from about 0° C. to about Tg of the polymer composition that was used to produce the capacitor films, or alternatively within a temperature range of from about 0° C. to about 200° C., alternatively from about 0° C. to about 190° C., alternatively from about 0° C. to about 170° C., or alternatively from about 0° C. to about 150° C.

In an embodiment, the capacitor films (e.g., capacitor films, metallized capacitor films) can be characterized by at least one region that is wrinkle-free (e.g., wrinkle-free region), wherein the wrinkle-free region can be sufficiently flat and smooth so that when a surface thereof is metallized, the metallized film has an advantageously consistent surface morphology.

In an embodiment, the capacitor films (e.g., capacitor films, metallized capacitor films) can be characterized by a film thickness of less than about 50 microns, alternatively less than about 40 microns, alternatively less than about 30 microns, alternatively less than about 20 microns, alternatively less than about 15 microns, or alternatively less than about 10 microns. In an embodiment, the capacitor films can be characterized by a film thickness of from about 0.1 microns to about 50 microns, alternatively from about 0.1 microns to about 20 microns, alternatively from about 0.1 microns to about 15 microns, alternatively from about 0.1 microns to about 10 microns, or alternatively from about 0.1 microns to about 7 microns.

As will be appreciated by one of skill in the art, and with the help of this disclosure, the thickness of the film can vary, even across wrinkle-free regions. Generally, flatness of the wrinkle-free regions of capacitor films can be determined by measuring a variation in thickness of the film over a specific area. For purposes of the disclosure herein, the capacitor films (e.g., capacitor films, metallized capacitor films) can be considered "flat" when characterized by a film thickness variation of less than about +/−10% of the film thickness, alternatively less than about +/−9% of the film thickness, alternatively less than about +/−8% of the film thickness, alternatively less than about +/−7% of the film thickness, alternatively less than about +/−6% of the film thickness, alternatively less than about +/−5% of the film thickness, alternatively less than about +/−4% of the film thickness, alternatively less than about +/−3% of the film thickness, alternatively less than about +/−2% of the film thickness, or alternatively less than about +/−1% of the film thickness, based on the average thickness of the film over a specific measured area. In an embodiment, the capacitor films (e.g., capacitor films, metallized capacitor films) can be characterized by a film thickness variation of less than about +/−1% of the film thickness, based on the average thickness of the film over a specific measured area.

Generally, the smoothness of the wrinkle-free regions of a surface of the films can be quantified by measuring the surface roughness average (Ra) of the surface by optical profilometry. Generally, a roughness of a surface refers to fine irregularities of the surface. Ra provides an average of individual heights and depths of such surface irregularities. For purposes of the disclosure herein, the capacitor films (e.g., capacitor films, metallized capacitor films) can be considered wrinkle-free when characterized by an Ra of less than about +/−3%, alternatively less than about +/−2%, alternatively less than about +/−1%, based on an average film thickness as measured by optical profilometry. In an embodiment, the capacitor films (e.g., capacitor films, metallized capacitor films) can be characterized by an Ra of less than about +/−3%, based on an average film thickness as measured by optical profilometry.

In an embodiment, the capacitor films (e.g., capacitor films, metallized capacitor films) can be characterized by a film thickness variation of less than about +/−10% of the film thickness, based on the average thickness of the film over a specific measured area; and by an Ra of less than about +/−3%, based on an average film thickness as measured by optical profilometry.

Generally, the capacitor film can be characterized by a film surface area, wherein the film surface area represents a total area of the capacitor film, including a first film side area and a second film side area.

In an embodiment, the wrinkle-free regions can be produced over a large film surface area. In an embodiment, at least about 80%, alternatively at least about 85%, alternatively at least about 90%, alternatively at least about 95%, or alternatively at least about 97% of the total film surface area can be wrinkle-free.

In another embodiment, the wrinkle-free region can have a contiguous wrinkle-free area of at least about 1 square meter (m$^2$), alternatively at least about 2 m$^2$, alternatively at least about 3 m$^2$, alternatively at least about 5 m$^2$, alternatively at least about 10 m$^2$, alternatively at least about 20 m$^2$, alternatively at least about 50 m$^2$, or alternatively at least about 100 m$^2$.

As will be appreciated by one of skill in the art, and with the help of this disclosure, the large size of the wrinkle-free regions offers a significant manufacturing advantage, in that the metallized capacitor films can be manufactured, stored, and shipped in roll form.

In an embodiment, the capacitor film can be characterized by a film length of from about 1 meter (m) to about 10,000 m, alternatively from about 10 m to about 1,000 m, or alternatively from about 100 m to about 10,000 m, or alternatively from about 100 m to about 500 m. In an embodiment, the capacitor film can be characterized by a film width of from about 100 mm to about 3,000 mm, alternatively from about 200 mm to about 2,000 mm, alternatively from about 300 mm to about 3,000 mm, or alternatively from about 100 mm to about 1,000 mm.

In an embodiment, the capacitor film can have a film length of at least about 10 m, and a film width of at least about 300 mm, wherein at least about 80%, alternatively at least about 85%, alternatively at least about 90%, alternatively at least about 95%, or alternatively at least about 97% of the total film surface area can be wrinkle-free.

In another embodiment, the capacitor film can have a film length of from about 10 m to about 10,000 m, and a film width of from about 300 mm to about 3,000 mm, wherein at least about 80%, alternatively at least about 85%, alternatively at least about 90%, alternatively at least about 95%, or alternatively at least about 97% of the total film surface area can be wrinkle-free.

In an embodiment, the wrinkle-free regions can be sufficiently smooth and flat such that the capacitor film can be metallized to provide a metallized capacitor film of substantially uniform breakdown strength (BDS) across the region. In an embodiment, the wrinkle-free regions can be sufficiently smooth and flat such that the capacitor film can be metallized to provide a metallized capacitor film having a BDS of at least 300 Volts/micrometer (V/micron), as described in more detail later herein.

In an embodiment, the capacitor films (e.g., un-metallized capacitor films) can be characterized by a BDS of from about 100 V/micron to about 1,500 V/micron, alternatively from about 200 V/micron to about 1,250 V/micron, alternatively from about 300 V/micron to about 1,000 V/micron, alternatively from about 500 V/micron to about 800 V/micron, or alternatively from about 600 V/micron to about 800 V/micron, as measured in accordance with ASTM D149 at 23° C. and 50% RH for a 10 micron film. Generally, BDS represents the maximum electric field (e.g., energy density)

a material can withstand before breaking down. As will be appreciated by one of skill in the art, and with the help of this disclosure, an improvement in electrical properties (e.g., Dk, BDS, etc.) significantly increases energy density based on the following theoretical equation (2):

$$\text{Energy Density} = 1/2 * co * Dk * BDS^2 \qquad (2)$$

wherein a linear and power law describes the relationship between energy density and Dk and BDS respectively; and wherein co is a constant representing the permittivity of free space. As will be appreciated by one of skill in the art, and with the help of this disclosure, it is especially difficult to increase a material's BDS without affecting other properties, Dk and Df, at high temperature and frequency. It should be noted a 25% increase in BDS increases energy density by 56%, whereas a change in Dk scales linearly.

In an embodiment, a BDS difference of the capacitor films from about 0° C. to about 200° C., alternatively from about 0° C. to about 190° C., alternatively from about 0° C. to about 170° C., or alternatively from about 0° C. to about 150° C., can be less than about 40%, alternatively by less than about 30%, alternatively by less than about 20%, or alternatively by less than about 10% of the BDS value at 23° C., wherein BDS is measured in accordance with ASTM D149.

In an embodiment, the capacitor films (e.g., un-metallized capacitor films) can have a difference in capacitance at 1 kHz and from about 0° C. to about 200° C., alternatively from about 0° C. to about 190° C., alternatively from about 0° C. to about 170° C., or alternatively from about 0° C. to about 150° C., of less than about +/−5%, alternatively less than about +/−4%, or alternatively less than about +/−3%, based on a capacitance value at 23° C. Generally, capacitance refers to the ability of a material to store electrical charge.

In an embodiment, the capacitor films (e.g., capacitor films, metallized capacitor films) can be characterized by a dynamic coefficient of friction on a metallized surface (e.g., aluminum surface) and/or on itself of less than about 0.75, alternatively less than about 0.6, or alternatively less than about 0.5, as measured in accordance with ASTM D1894. Generally, the dynamic coefficient of friction, also called the kinetic or sliding coefficient of friction or friction coefficient, is a measure of how large friction forces are between two solids, e.g., between two solid surfaces.

In an embodiment, the capacitor films (e.g., capacitor films, metallized capacitor films) can be characterized by a static coefficient of friction on a metallized surface (e.g., aluminum surface) and/or on itself of less than about 0.75, alternatively less than about 0.6, or alternatively less than about 0.5, as measured in accordance with ASTM D1894. Generally, the static coefficient of friction, is a measure of how large friction forces are between two solids, e.g., between two solid surfaces, when neither of the surfaces are moving.

In an embodiment, the capacitor films (e.g., capacitor films, metallized capacitor films) can be characterized by a Trouser tear strength in the machine direction (MD) of from about 0.4 N/mm to about 3.5 N/mm, alternatively from about 0.5 N/mm to about 3.0 N/mm, or alternatively from about 1 N/mm to about 2.5 N/mm, as measured in accordance with ASTM D1938 using a test specimen having a 20 microns thickness. In an embodiment the capacitor films (e.g., capacitor films, metallized capacitor films) can be characterized by a Trouser tear strength in the transverse direction (TD) of from about 0.4 N/mm to about 3.5 N/mm, alternatively from about 0.5 N/mm to about 3.0 N/mm, or alternatively from about 1 N/mm to about 2 N/mm, as measured in accordance with ASTM D1938 using a test specimen having a 20 microns thickness. The Trouser tear strength refers to the average force required to propagate a tear at a constant tearing speed across a specimen divided by the specimen thickness, and it is used for films with a thickness of less than 1 mm. The tear can be propagated either in the MD or TD.

In an embodiment, the capacitor films can be characterized by a carbon/(oxygen+hydrogen) (C/(O+H)) ratio of less than about 1.35, alternatively less than about 1.30, or alternatively less than about 1.25. For example, the C/(O+H) ratio for polyetherimide (PEI) is about 1.23; for polyetherimide sulfone (PEIS) is about 1.11; for ITR-PC-Si is about 1.10; for polyethylene napthalate (PEN) is about 1.00; for polyethylene terephthalate (PET) is about 0.83; for polyphenylene sulfone (PPSU) is about 0.92; and for polypropylene (PP) is about 0.50. Further, for example, polyphenylene sulfide (PPS), a material known to have a poor dielectric performance, has a C/(O+H) ratio of about 1.50. The C/(O+H) ratio can be important in a clearing process, with respect to char formation. Generally, clearing, also known as self-healing, refers to the removal of a defect caused by pinholes, film flaws or external voltage transients. The heat generated by the arcing during a breakdown, evaporates the extremely thin metalization of the film around the point of failure, thereby removing and isolating the short circuit conditions. The heat from the clearing process can lead to char formation. Without wishing to be limited by theory, if the C/(O+H) ratio is too high, for example 1.5 as in the case of PPS, carbon (e.g., char) could deposit as a thick layer, insulation resistance could be increased, and power could be more easily dissipated, which is undesirable.

In an embodiment, the capacitor films (e.g., capacitor films, metallized capacitor films) can be essentially solvent-free, that is, contain less than about 1,000 ppm, alternatively less than about 750 ppm, alternatively less than about 500 ppm, or alternatively less than about 250 ppm of a solvent (e.g., a compound having a Mw of less than about 250 Da), based on the total weight of the capacitor film.

In an embodiment, the capacitor films (e.g., capacitor films, metallized capacitor films) can have no observable specks or gels over an area of at least about 3 m², or over an area of at least about 9 m², when viewed at a distance of 0.3 m without magnification.

In an embodiment, the capacitor films (e.g., capacitor films, metallized capacitor films) comprise less than 2, or alternatively less than 1 carbonized inclusions having a diameter greater than about 20 microns in an area of 100 cm².

In an embodiment, the capacitor films (e.g., capacitor films, metallized capacitor films) comprise less than 2, or alternatively less than 1 gel areas having a diameter greater than about 20 microns in an area of 100 cm².

In an embodiment, the capacitor films (e.g., capacitor films, metallized capacitor films) can have no observable voids over an area of at least about 3 m², or over an area of at least about 9 m², when viewed at a magnification of 50×.

In an embodiment, an uniaxially-stretched, high yield extruded capacitor film comprising a miscible polymer blend comprises a polyetherimide and a polyester; wherein the polyetherimide comprises units derived from polymerization of an aromatic dianhydride with a diamine comprising a m-phenylenediamine, a p-phenylenediamine, or combinations thereof; wherein the polyetherimide is endcapped with a substituted or unsubstituted aromatic primary monoamine; wherein the polyester comprises repeating structural units derived from polymerization of an aromatic dicarboxylic acid with a dihydroxy compound; wherein the high yield extruded capacitor film is solvent-free and comprises equal to or greater than about 90 wt. % of the miscible polymer blend entering an extruder used for manufacturing the capacitor film, based on the total weight of miscible polymer blend prior to entering the extruder; wherein the capacitor film has a film thickness of from about 0.1 microns to about 20 microns; wherein the polyetherimide has a weight average molecular weight of from about 20,000 Da to about 400,000 Da, as determined by gel permeation chromatography (GPC) using a polystyrene standard; wherein the polyetherimide has a ratio of viscosity at 100 $sec^{-1}$ to a viscosity at 5,000 $sec^{-1}$ of less than about 10, as measured by capillary rheometry at 340° C.; wherein the polyetherimide has a tensile modulus of equal to or greater than about 380,000 psi (2,618 MPa), as determined in accordance with ASTM D638; wherein the polyester has a weight average molecular weight of from about 25,000 Da to about 75,000 Da, as measured by GPC; wherein the polyester has an intrinsic viscosity of from about 0.1 dl/g to about 0.83 dl/g; wherein the capacitor film has a glass transition temperature of greater than about 180° C.; wherein the capacitor film has a heat distortion temperature of equal to or greater than about 160° C. as measured in accordance with ASTM D648 at 264 psi (1.8 Mpa) on 3.2 millimeters (mm) thick samples; wherein the capacitor film has a dielectric constant of from about 3 to about 5 as measured in accordance with ASTM D150 at 1 kHz, 23° C. and 50% RH; wherein the capacitor film has a dissipation factor of from about 0.1% to about 0.5% as measured at 1 kHz, 23° C. and 50% RH; wherein the capacitor film has a breakdown strength of from about 600 V/micron to about 800 V/micron, as measured in accordance with ASTM D149 at 23° C.; wherein the capacitor film has a wrinkle-free region having a film thickness variation of less than about +/−10% of the film thickness, based on the average thickness of the film over a specific measured area; and wherein the capacitor film has a surface roughness average (Ra) of less than about +/−3%, based on an average film thickness as measured by optical profilometry. In such embodiment, the uniaxially-stretched, high yield extruded capacitor film comprising a miscible polymer blend comprises the polyetherimide and the polyester in a polyetherimide:polyester weight ratio of from about 60:40 to about 99.9:0.01. In such embodiment, the polyetherimide can further comprise polyetherimide sulfone.

In an embodiment, a method of manufacturing the uniaxially-stretched, high yield extruded capacitor film, for example the film described in the preceding paragraph, comprises (a) combining the polyetherimide and the polyester to form a miscible polymer blend, wherein the polyester comprises a low intrinsic viscosity polyethylene terephthalate having (i) a diethylene glycol derived content of from about 0.1 wt. % to about 4 wt. %, based on the total weight of the polyethylene terephthalate, (ii) an intrinsic viscosity of from about 0.1 dl/g to about 0.83 dl/g, and (iii) a carboxylic acid end groups content in an amount of from about 10 meq/kg to about 150 meq/kg; (b) melting and mixing the miscible polymer blend to form a molten polymer; (c) filtering the molten polymer to remove particles greater than about 1 micron to form a filtered molten polymer; (d) extruding the filtered molten polymer through a flat die at a temperature of from about 250° C. to about 500° C. to form a high yield extruded capacitor film, wherein the high yield extruded capacitor film comprises equal to or greater than about 90 wt. % of the miscible polymer blend entering an extruder used for manufacturing the capacitor film, based on the total weight of miscible polymer blend prior to entering the extruder; and (e) uniaxially stretching the high yield extruded capacitor film to form the uniaxially-stretched, high yield extruded capacitor film; wherein the uniaxially-stretched, high yield extruded capacitor film is further metallized and wound to form a wound metallized capacitor film.

In an embodiment, an uniaxially-stretched, high yield extruded capacitor film comprising a miscible polymer blend comprises a polyetherimide sulfone and a polyester; wherein the polyetherimide sulfone comprises units derived from polymerization of an aromatic dianhydride with a diamine comprising a diamino diphenyl sulfone; wherein the polyetherimide sulfone is endcapped with a substituted or unsubstituted aromatic primary monoamine; wherein the polyester comprises repeating structural units derived from polymerization of an aromatic dicarboxylic acid with a dihydroxy compound; wherein the high yield extruded capacitor film is solvent-free and comprises equal to or greater than about 90 wt. % of the miscible polymer blend entering an extruder used for manufacturing the capacitor film, based on the total weight of miscible polymer blend prior to entering the extruder; wherein the capacitor film has a film thickness of from about 0.1 microns to about 20 microns; wherein the polyetherimide sulfone has a weight average molecular weight of from about 20,000 Da to about 400,000 Da, as determined by gel permeation chromatography (GPC) using a polystyrene standard; wherein the polyetherimide sulfone has a ratio of viscosity at 100 $sec^{-1}$ to a viscosity at 5,000 $sec^{-1}$ of less than about 10, as measured by capillary rheometry at 340° C.; wherein the polyetherimide sulfone has a tensile modulus of equal to or greater than about 380,000 psi (2,618 MPa), as determined in accordance with ASTM D638; wherein the polyester has a weight average molecular weight of from about 25,000 Da to about 75,000 Da, as measured by GPC; wherein the polyester has an intrinsic viscosity of from about 0.1 dl/g to about 0.83 dl/g; wherein the capacitor film has a glass transition temperature of greater than about 180° C.; wherein the capacitor film has a heat distortion temperature of equal to or greater than about 160° C. as measured in accordance with ASTM D648 at 264 psi (1.8 Mpa) on 3.2 millimeters (mm) thick samples; wherein the capacitor film has a dielectric constant of from about 3 to about 5 as measured in accordance with ASTM D150 at 1 kHz, 23° C. and 50% RH; wherein the capacitor film has a dissipation factor of from about 0.1% to about 0.5% as measured at 1 kHz, 23° C. and 50% RH; wherein the capacitor film has a breakdown strength of from about 600 V/micron to about 800 V/micron, as measured in accordance with ASTM D149 at 23° C.; wherein the capacitor film has a wrinkle-free region having a film thickness variation of less than about +/−10% of the film thickness, based on the average thickness of the film over a specific measured area; and wherein the capacitor film has a surface roughness average (Ra) of less than about +/−3%, based on an average film thickness as measured by optical profilometry. In such embodiment, the uniaxially-stretched, high yield extruded capacitor film comprising a miscible polymer blend comprises the polyetherimide sulfone and the polyester in a polyetherimide sulfone:polyester weight ratio of from about 60:40 to about 99.9:0.01.

In an embodiment, a method of manufacturing the uniaxially-stretched, high yield extruded capacitor film, for example the film described in the preceding paragraph, comprises (a) combining the polyetherimide sulfone and the polyester to form a miscible polymer blend, wherein the polyester comprises a low intrinsic viscosity polyethylene terephthalate having (i) a diethylene glycol derived content of from about 0.1 wt. % to about 4 wt. %, based on the total weight of the polyethylene terephthalate, (ii) an intrinsic viscosity of from about 0.1 dl/g to about 0.83 dl/g, and (iii) a carboxylic acid end groups content in an amount of from about 10 meq/kg to about 150 meq/kg; (b) melting and mixing the miscible polymer blend to form a molten polymer; (c) filtering the molten polymer to remove particles greater than about 1 micron to form a filtered molten polymer; (d) extruding the filtered molten polymer through a flat die at a temperature of from about 250° C. to about 500° C. to form a high yield extruded capacitor film, wherein the high yield extruded capacitor film comprises equal to or greater than about 90 wt. % of the miscible polymer blend entering an extruder used for manufacturing the capacitor film, based on the total weight of miscible polymer blend prior to entering the extruder; and (e) uniaxially stretching the high yield extruded capacitor film to form the uniaxially-stretched, high yield extruded capacitor film; wherein the uniaxially-stretched, high yield extruded capacitor film is further metallized and wound to form a wound metallized capacitor film.

In an embodiment, the capacitor films as disclosed herein can be used in any amorphous film application, but are particularly suitable for metallization. In an embodiment, the metallized capacitor films can be used in any metallized film application, but are particularly suitable for electrical applications, for example as capacitors or circuit materials. High energy density (e.g., above about 1 J/cm$^3$), high voltage (e.g., above about 150 V) non-polar capacitors can be made using a metallized polymer film that is wound into a cylindrical shape (e.g., a wound metallized capacitor film) or stacked and pressed into a rectangular or square shape (e.g., stacked film capacitors, diced film capacitors).

In an embodiment, the capacitor films as disclosed herein can be formed into various articles, including, but not limited to electronic articles, such as for example a capacitor (e.g., a capacitor for an automotive inverter, a capacitor for an automotive converter, etc.).

In an embodiment, the polymer composition for capacitor films can be extruded, then metallized by spraying a conductive metal such as copper or aluminum onto the moving polymer film via vapor deposition in a vacuum chamber, to a metal layer thickness of from about 1 Angstrom to about 1,000 nanometers, alternatively from about 1 Angstrom to about 3,000 Angstroms, or alternatively from about 1 Angstrom to about 1,000 Angstroms. The resistivity of the metal layer on the capacitor film can be in a range from about 0.1 Ohms per square to about 100 Ohms per square. Before the metallization process is performed, the polymer film can be appropriately masked to provide unmetallized margins at the edges of the width of the film, so that alternate layers of metallized film (when the capacitor is assembled) can have unmetallized regions at opposite edges to prevent electrical shorting of electrodes of the capacitor when the end metallization is ultimately applied.

In an embodiment, the capacitors can be fabricated by rolling two stacked metalized polymer films into a tubular shape. Electrical wires can then be connected to each metal layer. In an embodiment, two separate rolls of the metallized film can be placed in a capacitor winder and wound tightly together on a mandrel (which may subsequently be removed) so that the layers are arranged in the sequence polymer composition/metallized layer/polymer composition/metallized layer, to replicate a typical construction of a capacitor, i.e., a dielectric with two metallic layers on opposite sides. In an embodiment, the capacitor comprises a wound metallized capacitor film. The two rolls of film can be wound with the unmetallized margins on opposite sides.

As will be appreciated by one of skill in the art, and with the help of this disclosure, the extent of winding of the capacitor depends on the physical size of the capacitor desired or on the capacitance desired. Tight winding of the two rolls aids in removing any entrapped air that might otherwise cause premature breakdown. Individual capacitors can be processed in a clean room environment of at least class 100, incorporating HEPA filters, to reduce the likelihood of contamination of the contact point between the dielectric film layers by foreign particles as well as reducing moisture intake in the dielectric. Electric winding can be used to better maintain uniform tension on each capacitor. The capacitor can then be taped at the edges thereof and strapped in a tray open on both sides, to prevent unwinding of the film layers and to allow the edges or ends of the cylinder to be sprayed with a conductive element, for example a conductive metal. For direct current (DC) applications, a first spray with a high zinc content solder, followed by a regular softer end spray solder of 90% tin, 10% zinc, could be used. The first spray scratches the metallized surface and creates a trough to achieve better contact with the metallization on the dielectric film. The combination of end sprays further aids better contact adhesion with the final termination. Subsequently, conductive (e.g., aluminum) leads can then be soldered onto each end to form the final termination. One termination can be spot welded to the bottom of the can, while the other termination can be parallel welded to the lid. The capacitor can be filled with a liquid impregnate (e.g., isopropyl phenyl sulfone), in vacuum filling apparatus, and closed.

In another embodiment, an electronic article can comprise capacitors made from wound metallized uniaxially-stretched extruded film (e.g., metallized capacitor film, wound metallized capacitor film).

As will be appreciated by one of skill in the art, and with the help of this disclosure, other capacitor configurations are possible. For example, the capacitor can have a flat configuration comprising at least a first and a second electrode disposed in a stacked configuration; and the capacitor film disposed between and in at least partial contact with each of the first and second electrodes. Additional capacitor films and electrode layers can be present in alternating layers. In an embodiment, a multilayer article for forming an electronic device can comprise a polymer composition layer/metal layer/dielectric layer, wherein the dielectric layer can be a capacitor film as disclosed herein, or other dielectric material. Additional layers (e.g., additional alternating dielectric/metal layers) can optionally be present.

In some embodiments, capacitor films (e.g., metallized capacitor films) can be stacked to form a stacked film capacitor. The metallized capacitor films can be coated with an adhesive (e.g., a wax) prior to stacking. Upon stacking the metallized capacitor films, unmetallized capacitor films or unmetallized sheets can be applied at a top and/or at a bottom of a stack of metallized capacitor films, and the resulting stack can be further compressed and heated, to promote bonding of metallized capacitor film sheets to each other, thereby forming the stacked film capacitor. In an embodiment, the stacked film capacitor can be further diced (e.g., cut, cubed, chopped, portioned, divided, etc.) to form diced film capacitors. In an embodiment, at least one conductive layer can be applied to the diced film capacitor. As will be appreciated by one of skill in the art, and with the help of this disclosure, stacked film capacitors and diced film capacitors are high energy density capacitors.

In an embodiment, a capacitor film comprising the polymer composition as disclosed herein can be part of an automotive inverter and/or converter (e.g., an inverter for a hybrid electric car, a converter for a hybrid electric car, an inverter for an electric car, a converter for an electric car, etc.).

In an embodiment, the capacitor films produced from polymer compositions of this disclosure (e.g., polyetherimide and/or polyetherimide sulfone, and polyester compositions) can advantageously display improved electrical properties (e.g., BDS, Dk, Df), as compared to films produced from other polymers, such as for example biaxially-oriented poly(propylene) (BOPP), polyphenylene sulfide (PPS), polyether ether ketone (PEEK), etc. As will be appreciated by one of skill in the art, and with the help of this disclosure, it is extremely difficult to obtain the proper combination of electrical properties to achieve a high energy density while maintaining high temperature capability in addition to being melt processed into a thin film. It is with this consideration that dielectric films made with a material consisting of polymer compositions for capacitor films as disclosed herein (e.g., polyetherimide and/or polyetherimide sulfone, and polyester compositions) is both novel and useful. The films and capacitors made from the films accordingly offer advantages over current materials and methods for the manufacture of components for the electronics industry.

In an embodiment, the capacitor films produced from polymer compositions of this disclosure (e.g., polyetherimide and/or polyetherimide sulfone, and polyester compositions) can advantageously display a Dk that is stable up to about 170° C. As will be appreciated by one of skill in the art, and with the help of this disclosure, electrical properties of capacitor films are generally stable up to the Tg of the capacitor films.

In an embodiment, the capacitor films produced from polymer compositions of this disclosure (e.g., polyetherimide and/or polyetherimide sulfone, and polyester compositions) can be advantageously produced in a solventless process, which provides for the ability to reliably manufacture such capacitor films on industrial scale. For conventional capacitor films, it can be difficult to remove solvent from solvent-case films. The extruded capacitor films as disclosed herein can be processed without solvent, providing both a cost and a manufacturing advantage, as well as being more environmentally friendly. In an embodiment, the capacitor films produced from polymer compositions of this disclosure (e.g., polyetherimide and/or polyetherimide sulfone, and polyester compositions) can be advantageously processed by melt extrusion into a uniform film thickness of less than about 20 microns.

In an embodiment, the capacitor films produced from polymer compositions of this disclosure (e.g., polyetherimide and/or polyetherimide sulfone, and polyester compositions) can advantageously display improved melt flow rheology at processing temperature when compared, for example, with the polyetherimide and/or polyetherimide sulfone, component by itself. Generally, polyesters have a low viscosity when compared to polyetherimide and/or polyetherimide sulfone, and as such the polyesters improve processability of the polyetherimide and/or polyetherimide sulfone by lowering its viscosity when blended together.

In an embodiment, the capacitor films produced from polymer compositions of this disclosure (e.g., polyetherimide and/or polyetherimide sulfone, and polyester compositions) can be advantageously display an increase in both Dk and BDS as compared to conventional capacitor films, while retaining other advantageous physical and electrical characteristics, such as flexibility, thinness, and dielectric constant stability. In some embodiments, the capacitor films as disclosed herein can have a high BDS (greater than about 600 V/micron), a high Dk (greater than about 3) and a low Df (less than about 1%).

In an embodiment, the capacitor films produced from polymer compositions of this disclosure (e.g., polyetherimide and/or polyetherimide sulfone, and polyester compositions) can be advantageously employed in the automotive industry (e.g., electrical car inverters and/or converters, DC-DC converters, AC-DC inverters, filters, circuit isolation, etc.), as well as in any electrical/electronic applications requiring high operating temperatures and high energy density dielectric materials. Additional advantages of the capacitor films produced from polymer compositions of this disclosure (e.g., polyetherimide and/or polyetherimide sulfone, and polyester compositions) can be apparent to one of skill in the art viewing this disclosure.

EXAMPLES

The subject matter having been generally described, the following examples are given as particular embodiments of the disclosure and to demonstrate the practice and advantages thereof. It is understood that the examples are given by way of illustration and are not intended to limit the specification of the claims to follow in any manner. The following testing procedures were used to evaluate the various capacitor films and polymer compositions.

Glass transition temperature (Tg) of the capacitor films was measured using differential scanning calorimetry (DSC) at a heating rate of 20° C./min to 300° C. for polyetherimide (control/comparative), and 250° C. for capacitor films made out of polymer compositions for capacitor films as disclosed herein. Results were reported on a second scan.

Trouser tear strength of samples of the film were measured in the machine direction (MD) and transverse direction (TD) in accordance with ASTM D1938.

Dynamic and static coefficient of friction of the extruded film was measured in accordance with ASTM D1894 on an aluminum surface.

Clarity of film was observed by visual assessment of the film surface. The capacitor film was without visual haze or opacity.

Extruded thin films of each material were tested for dielectric breakdown strength (BDS) using ASTM D149 test methods in GALDEN HT oil, wherein GALDEN HT is a line of dielectric fluids with boiling points ranging from 55° C. to 270° C., and is commercially available from Ideal Vacuum Products, LLC. The oil was brought to test temperature using a hotplate/resistive coil. The electrodes consisted of a ¼ inch stainless steel ball on a 3 inch brass plate bottom electrode. The brass plate ramped at 500V/s using a Trek 30/20±30 kV DC high voltage power supply until the material electrically shorted and the voltage which caused the breakdown was recorded by Labview computer software. BDS was measured at 20° C., 50° C., 100° C., 135° C., and 150° C. The reported values represent an average over 20 samples at each temperature and the Weibull statistical analysis was reported.

The dielectric constant (Dk) and dissipation factor (Df) were measured on film samples by the following method. Gold, 100 nm thick, was deposited on 5 samples of each type of material through a 10 mm circular shadow mask by electron-beam evaporation as top electrodes. The bottom electrode consisted of gold at 100 nm thickness over the area of the entire bottom of the sample. An Agilent E4980A Precision LCR Meter was used to measure capacitance and dissipation factor at an applied bias field. Dk was calculated using the diameter of the electrode (10 mm circular diameter electrode was used for all electrical tests) and film thickness. Film thickness was calculated using a Heidenhain Metro thickness gauge accurate to +0.2 m. The furnace temperature was varied from −40° C. to 150° C. and the LCR meter changed the frequency range from 100 Hz to 1 GHz at each respective temperature. A thermocouple inside the furnace connected to a digital multi-meter verified the furnace temperature.

Example 1

The properties of the polymer compositions for capacitor films comprising a polyetherimide (PEI) and a polyester (PE) were studied. More specifically, the samples as outlined in Table 1 were first compounded into pellets and then extruded into films.

TABLE 1

| Materials Description | Experimental Blends (wt. %) | | | |
|---|---|---|---|---|
| | Sample A (Comparative) | Sample #1 | Sample #2 | Sample #3 |
| PEI: ULTEM 1010K resin, aniline endcapped | 100 | 82.5 | 80 | 85 |
| PET, IV of 0.83 dl/g | — | 17.5 | — | — |
| PEN (KALADEX) | — | — | 20 | — |
| Co-PEN | — | — | — | 15 |
| Phosphite Stabilizer | 0.1 | 0.06 | — | — |

ULTEM 1010K is PEI characterized by Structure Vb. PET is a polyester characterized by Structure XIII. PEN was a KALADEX polymer characterized by Structure XIV. Co-PEN was a copolyester of PEN supplied by Imperial Chemical Industries (ICI). Phosphite stabilizer was IRGAPHOS 168 (tris-di-tert-butylphenyl phosphite).

The properties of the extruded material are displayed in Table 2.

TABLE 2

| Material Properties | Sample A | Sample #1 | Sample #2 | Sample #3 |
|---|---|---|---|---|
| Extruded Pellet Appearance | Transparent | Transparent | Transparent | Transparent |
| Tensile Strength at Yield in Kpsi (MPa) | 15.9 (110) | 16.4 (113) | 15.5 (107) | 15.2 (105) |
| Tensile Modulus in Kpsi (MPa) | 503 (3466) | 488 (3366) | 486 (3350) | 475 (3276) |
| Tensile Elongation at Break (%) | 60 | 51 | 10 | 7 |
| Flexural Strength in Kpsi (MPa) | 24.8 (171) | 25.8 (178) | 24.9 (172) | 25.1 (173) |
| Flexural Modulus in Kpsi (MPa) | 490 (3380) | 509 (3510) | 478 (3300) | 492 (3390) |
| Glass Transition Temperature (Tg) in ° C. | 217 | 175 | 188 | 189 |
| HDT, 264 psi (1.8 MPa) in ° C. | 191 | 151 | 168 | 164 |
| Melt Volume Rate (cc/10 min) at 337° C., 6.7 kgf | 16.6 | — | — | — |
| Melt Volume Rate (cc/10 min) at 295° C., 6.7 kgf | — | 12.4 | 5.4 | 6.6 |
| Viscosity Ratio (100 sec$^{-1}$ and 5,000 sec$^{-1}$) at 340° C. | 7.1 | 4.2 | 4.7 | 4.7 |
| Specific Gravity | 1.281 | 1.297 | 1.294 | 1.294 |

The resin blends (e.g., polymer compositions for capacitor films) were easily compounded using a twin screw into a pellet form prior to melt extrusion into a film with a thickness of 10 microns. The increase in performance as a function of temperature and frequency were surprising and not predicted for material properties of dielectric breakdown strength (BDS), dielectric constant (Dk) and dissipation factor (Df). The improvement in properties significantly increases energy density based on equation (2), where a linear and power law describes the relationship for Dk and BDS respectively.

Example 2

The electrical properties of film samples prepared as described in Example 1 from polymer compositions for capacitor films comprising a polyetherimide (PEI) and a polyester (PE) were studied. More specifically, the average breakdown strength (BDS) was studied.

The average BDS values [V/micron] of materials trialed as a function of composition and temperature are presented in Table 3.

TABLE 3

| Temperature [° C.] | Sample A | Sample #1 | Sample #2 | Sample #3 |
|---|---|---|---|---|
| RT | 588 | 697 | 666 | 644 |
| 50 | 595 | 605 | 558 | 651 |
| 100 | 587 | 537 | 716 | 647 |
| 135 | 576 | 622 | 641 | 690 |
| 150 | 550 | 536 | 590 | 669 |

BDS of a 10 micron thick film generally increased in value from comparative sample A to sample #1, sample #2, and sample #3, and the BDS increased values ranged from 644 V/micron at room temperature to 669 V/micron at 150° C. with peak BDS ranging from 690 V/micron to 716 V/micron. The BDS increase represented a 9.5% to 21.6% increase in BDS performance therefore increasing energy density by 20% to 48% (scales to power of 2 in equation (2)). In addition, it was noted a maximum was obtained at a specific temperature for each example material and ranged between RT to 135° C. It is not uncommon for a material's BDS to decrease with an increase in temperature after reaching a maximum value. The non-linear response with composition was not anticipated nor expected.

Example 3

The electrical properties of film samples prepared as described in Example 1 from polymer compositions for capacitor films comprising a polyetherimide (PEI) and a polyester (PE) were studied. More specifically, the dielectric constant (Dk) and the dissipation factor (Df) were studied.

The Dk and Df were investigated for 10 micron thick films as a function of temperature and frequency and the data are presented in Table #4 (Dk) and Table #5 (Df).

TABLE 4

| Frequency | Material | | | |
|---|---|---|---|---|
| | Sample A | Sample #1 | Sample #2 | Sample #3 |
| 20° C. | | | | |
| 100 Hz | 3.07 | 3.29 | 3.28 | 3.17 |
| 1 kHz | 3.06 | 3.28 | 3.26 | 3.17 |
| 10 kHz | 3.06 | 3.27 | 3.24 | 3.16 |
| 100 kHz | 3.05 | 3.24 | 3.20 | 3.13 |
| 1 MHz | 3.05 | 3.23 | 3.16 | 3.11 |
| 50° C. | | | | |
| 100 Hz | 3.06 | 3.29 | 3.26 | 3.17 |
| 1 kHz | 3.05 | 3.28 | 3.24 | 3.16 |
| 10 kHz | 3.05 | 3.28 | 3.22 | 3.15 |
| 100 kHz | 3.04 | 3.26 | 3.20 | 3.14 |
| 1 MHz | 3.04 | 3.25 | 3.16 | 3.12 |
| 100° C. | | | | |
| 100 Hz | 3.02 | 3.28 | 3.17 | 3.14 |
| 1 kHz | 3.01 | 3.27 | 3.15 | 3.13 |
| 10 kHz | 3.00 | 3.26 | 3.13 | 3.12 |
| 100 kHz | 2.99 | 3.25 | 3.11 | 3.11 |
| 1 MHz | 3.00 | 3.25 | 3.09 | 3.10 |
| 130° C. | | | | |
| 100 Hz | 3.02 | 3.27 | 3.14 | 3.13 |
| 1 kHz | 3.00 | 3.26 | 3.12 | 3.12 |
| 10 kHz | 2.99 | 3.25 | 3.10 | 3.11 |
| 100 kHz | 2.98 | 3.24 | 3.08 | 3.10 |
| 1 MHz | 2.99 | 3.24 | 3.06 | 3.09 |
| 150° C. | | | | |
| 100 Hz | 3.02 | 3.29 | 3.14 | 3.13 |
| 1 kHz | 3.01 | 3.27 | 3.12 | 3.12 |
| 10 kHz | 2.99 | 3.25 | 3.10 | 3.11 |
| 100 kHz | 2.98 | 3.24 | 3.07 | 3.09 |
| 1 MHz | 2.99 | 3.25 | 3.06 | 3.08 |

TABLE 5

| Frequency | Material | | | |
|---|---|---|---|---|
| | Sample A | Sample #1 | Sample #2 | Sample #3 |
| 20° C. | | | | |
| 100 Hz | 0.168 | 0.068 | 0.349 | 0.178 |
| 1 kHz | 0.153 | 0.214 | 0.424 | 0.208 |
| 10 kHz | 0.193 | 0.393 | 0.641 | 0.365 |
| 100 kHz | 0.303 | 0.621 | 0.966 | 0.580 |
| 1 MHz | 0.340 | 0.772 | 1.053 | 0.517 |
| 50° C. | | | | |
| 100 Hz | 0.216 | 0.150 | 0.377 | 0.183 |
| 1 kHz | 0.179 | 0.171 | 0.406 | 0.183 |
| 10 kHz | 0.156 | 0.241 | 0.489 | 0.234 |
| 100 kHz | 0.212 | 0.472 | 0.713 | 0.428 |
| 1 MHz | 0.338 | 0.783 | 1.038 | 0.524 |
| 100° C. | | | | |
| 100 Hz | 0.298 | 0.121 | 0.423 | 0.206 |
| 1 kHz | 0.252 | 0.203 | 0.461 | 0.223 |
| 10 kHz | 0.208 | 0.199 | 0.480 | 0.216 |
| 100 kHz | 0.168 | 0.263 | 0.513 | 0.256 |
| 1 MHz | 0.207 | 0.563 | 0.740 | 0.342 |
| 130° C. | | | | |
| 100 Hz | 0.292 | 0.225 | 0.438 | 0.248 |
| 1 kHz | 0.282 | 0.245 | 0.495 | 0.262 |
| 10 kHz | 0.246 | 0.237 | 0.512 | 0.255 |
| 100 kHz | 0.203 | 0.263 | 0.523 | 0.268 |
| 1 MHz | 0.213 | 0.539 | 0.802 | 0.371 |
| 150° C. | | | | |
| 100 Hz | 0.264 | 0.333 | 0.436 | 0.248 |
| 1 kHz | 0.294 | 0.332 | 0.511 | 0.282 |
| 10 kHz | 0.280 | 0.308 | 0.543 | 0.274 |
| 100 kHz | 0.242 | 0.327 | 0.587 | 0.318 |
| 1 MHz | 0.247 | 0.698 | 1.232 | 0.396 |

As presented in Table 4, Dk decreases with increasing temperature at constant frequency and it is the extent of the change in Dk and its value that is of importance. Dk for sample A ranged from 3.06 to 3.01 with a temperature increase from 20° C. to 150° C. at 1 kHz. In contrast, sample 1 was insensitive to a change in temperature at a respective frequency resulting in a Dk that remained relatively unchanged. This was demonstrated for sample #1 at 1 kHz with Dk remaining largely unchanged at 3.28 to 3.27 from 20° C. to 150° C. Sample #2 and sample #3 demonstrated a similar trend as sample A, however Dk values at 20° C. to 150° C. at 1 kHz were significantly higher for the experimental blends, which values ranged from 3.26 to 3.12, and 3.17 to 3.12, respectively. In addition, Dk values will generally decrease as frequency increases at a constant temperature. Dk for sample A at 20° C. changed from 3.07 to 3.05 for a frequency range of 100 Hz to 1 MHz. A similar trend is reported for sample #1, sample #2 and sample #3, however at a higher Dk values. The increase in Dk is attributed to the addition of PET, PEN and co-PEN polyester polymers which are characterized by a Dk ranging from 3.2 to 3.3 at 1 kHz and 20° C. The significance of a high Dk is its direct translation into higher energy densities, as described by equation (2).

Df of sample #1, sample #2 and sample #3 all increased as temperature and frequency changed dependent on film composition when compared to sample A. It is generally understood that a higher Dk will lead to higher Df. Df for sample #1 ranged from 0.214% to 0.332% versus 0.153% to 0.294% for sample A over a temperature range of 20° C. to 150° C. at 1 kHz. In a similar fashion, Df for sample #2 and sample #3 increased from 0.424% to 0.511%, and 0.208% to 0.282%, respectively. The Df was expected to increase with PET, PEN or co-PEN content in the capacitor film since it is a characteristic of polyester materials (higher Df) whereas PEI remains relatively stable over the temperature range. An increase in Df is considered less than ideal; however all samples performed well below the less than 1% requirement for capacitor film applications.

Table 6 summarizes some of the capacitor film properties for the tested samples, indicating the usefulness of adding a polyester resin into ULTEM resin to improve dielectric performance in high temperature and high energy capacitors.

TABLE 6

| Material Properties | Sample A | Sample #1 | Sample #2 | Sample #3 |
|---|---|---|---|---|
| Film Appearance | Transparent | Transparent | Transparent | Transparent |
| Tear Strength, 20 micron thickness, machine direction, in N/mm | 1.93 | 2.38 | 0.91 | 2.09 |
| Tear Strength, 20 micron thickness, transverse direction, in N/mm | 1.94 | 2.40 | 1.18 | 2.38 |
| Coefficient of Friction on Aluminum, static | 0.338 | 0.41 | 0.47 | 0.36 |
| Coefficient of Friction on Aluminum, dynamic | 0.223 | 0.32 | 0.35 | 0.31 |
| Dielectric Constant at 1 kHz, 73 F. (23° C.), 50% RH | 3.06 | 3.28 | 3.26 | 3.17 |
| Dissipation Factor at 1 kHz, 73 F. (23° C.), 50% RH as a % | 0.15 | 0.21 | 0.42 | 0.21 |
| Dielectric Breakdown Strength, 73 F. (23° C.), 50% RH. 10 micron thickness in V/micron | 588 | 697 | 666 | 644 |

For the purpose of any U.S. national stage filing from this application, all publications and patents mentioned in this disclosure are incorporated herein by reference in their entireties, for the purpose of describing and disclosing the constructs and methodologies described in those publications, which might be used in connection with the methods of this disclosure. Any publications and patents discussed herein are provided solely for their disclosure prior to the filing date of the present application. Nothing herein is to be construed as an admission that the inventors are not entitled to antedate such disclosure by virtue of prior invention.

In any application before the United States Patent and Trademark Office, the Abstract of this application is provided for the purpose of satisfying the requirements of 37 C.F.R. § 1.72 and the purpose stated in 37 C.F.R. § 1.72(b) "to enable the United States Patent and Trademark Office and the public generally to determine quickly from a cursory inspection the nature and gist of the technical disclosure." Therefore, the Abstract of this application is not intended to be used to construe the scope of the claims or to limit the scope of the subject matter that is disclosed herein. Moreover, any headings that can be employed herein are also not intended to be used to construe the scope of the claims or to limit the scope of the subject matter that is disclosed herein. Any use of the past tense to describe an example otherwise indicated as constructive or prophetic is not intended to reflect that the constructive or prophetic example has actually been carried out.

The present disclosure is further illustrated by the following examples, which are not to be construed in any way as imposing limitations upon the scope thereof. On the contrary, it is to be clearly understood that resort can be had to various other aspects, embodiments, modifications, and equivalents thereof which, after reading the description herein, can be suggest to one of ordinary skill in the art without departing from the spirit of the present invention or the scope of the appended claims.

ADDITIONAL DISCLOSURE

The following are nonlimiting specific embodiments in accordance with the present disclosure:

A first embodiment, which is a uniaxially-stretched, high yield extruded capacitor film comprising a miscible polymer blend comprising a polyetherimide and a polyester; wherein the polyetherimide comprises units derived from polymerization of an aromatic dianhydride with a diamine comprising a m-phenylenediamine, a p-phenylenediamine, or combinations thereof; wherein the polyetherimide is endcapped with a substituted or unsubstituted aromatic primary monoamine; wherein the polyester comprises repeating structural units derived from polymerization of an aromatic dicarboxylic acid with a dihydroxy compound; and wherein the high yield extruded capacitor film comprises equal to or greater than about 90 wt. % of the miscible polymer blend entering an extruder used for manufacturing the capacitor film, based on the total weight of miscible polymer blend prior to entering the extruder.

A second embodiment, which is the capacitor film of the first embodiment, wherein the capacitor film has a thickness of from about 0.1 microns to about 50 microns.

A third embodiment, which is the capacitor film of any of the first through the second embodiments, wherein the capacitor film has a thickness of from about 0.1 microns to about 20 microns.

A fourth embodiment, which is the capacitor film of any of the first through the third embodiments, wherein the polyetherimide has a weight average molecular weight of from about 20,000 Da to about 400,000 Da, as determined by gel permeation chromatography (GPC) using a polystyrene standard; wherein the polyetherimide has a ratio of viscosity at 100 sec$^{-1}$ to a viscosity at 5,000 sec$^{-1}$ of less than about 11, as measured by capillary rheometry at 340° C.; wherein the polyetherimide has a tensile modulus of equal to or greater than about 380,000 psi (2,618 MPa), as determined in accordance with ASTM D638; wherein the polyester has a weight average molecular weight of from about 25,000 Da to about 75,000 Da, as measured by GPC; wherein the polyester has an intrinsic viscosity of from about 0.1 dl/g to about 0.83 dl/g; wherein the capacitor film has a glass transition temperature of greater than about 170° C.; wherein the capacitor film has a heat distortion temperature of equal to or greater than about 150° C. as measured in accordance with ASTM D648 at 264 psi (1.8 Mpa) on 3.2 millimeters (mm) thick samples; wherein the capacitor film has a dielectric constant of from about 3 to about 5 as measured in accordance with ASTM D150 at 1 kHz, 23° C. and 50% relative humidity (RH); wherein the capacitor film has a dissipation factor of from about 0% to about 1% as measured at 1 kHz, 23° C. and 50% RH; wherein the capacitor film has a breakdown strength of from about 500 V/micron to about 800 V/micron, as measured in accordance with ASTM D149 at 23° C.; wherein the capacitor film has a wrinkle-free region having a film thickness variation of less than about +/−10% of the film thickness, based on the average thickness of the film over a specific measured area; and wherein the capacitor film has a surface roughness average (Ra) of less than about +/−3%, based on an average film thickness as measured by optical profilometry.

A fifth embodiment, which is the capacitor film of any of the first through the fourth embodiments, wherein the polyetherimide has a weight average molecular weight of from about 20,000 Da to about 400,000 Da, as determined by gel permeation chromatography (GPC) using a polystyrene standard; wherein the polyetherimide has a ratio of viscosity at 100 sec$^{-1}$ to a viscosity at 5,000 sec$^{-1}$ of less than about 10, as measured by capillary rheometry at 340° C.; wherein the polyetherimide has a tensile modulus of equal to or greater than about 380,000 psi (2,618 MPa), as determined in accordance with ASTM D638; wherein the polyester has a weight average molecular weight of from about 25,000 Da to about 75,000 Da, as measured by GPC; wherein the polyester has an intrinsic viscosity of from about 0.1 dl/g to about 0.83 dl/g; wherein the capacitor film has a glass transition temperature of greater than about 190° C.; wherein the capacitor film has a heat distortion temperature of equal to or greater than about 170° C. as measured in accordance with ASTM D648 at 264 psi (1.8 Mpa) on 3.2 millimeters (mm) thick samples; wherein the capacitor film has a dielectric constant of from about 3 to about 5 as measured in accordance with ASTM D150 at 1 kHz, 23° C. and 50% RH; wherein the capacitor film has a dissipation factor of from about 0.1% to about 0.5% as measured at 1 kHz, 23° C. and 50% RH; wherein the capacitor film has a breakdown strength of from about 600 V/micron to about 800 V/micron, as measured in accordance with ASTM D149 at 23° C.; wherein the capacitor film has a wrinkle-free region having a film thickness variation of less than about +/−10% of the film thickness, based on the average thickness of the film over a specific measured area; and wherein the capacitor film has a surface roughness average (Ra) of less than about +/−3%, based on an average film thickness as measured by optical profilometry.

A sixth embodiment, which is the capacitor film of any of the first through the fifth embodiments, wherein the capacitor film has a dynamic coefficient of friction on a metallized surface, on aluminum, and/or on itself of less than about 0.75, as measured in accordance with ASTM D1894.

A seventh embodiment, which is the capacitor film of any of the first through the sixth embodiments, wherein the capacitor film has a static coefficient of friction on a metallized surface, on aluminum, and/or on itself of less than about 0.75, as measured in accordance with ASTM D1894.

An eighth embodiment, which is the capacitor film of any of the first through the seventh embodiments, wherein a dielectric constant of the capacitor film at 1 kHz remains essentially unchanged from about 0° C. to about 170° C., wherein the dielectric constant varies by less than about 20%, based on the highest dielectric constant value within a temperature range of from about 0° C. to about 170° C.

A ninth embodiment, which is the capacitor film of any of the first through the eighth embodiments, wherein the dissipation factor of the capacitor film at 1 kHz remains essentially unchanged from about 0° C. to about 170° C., and wherein the dissipation factor is from about 0.1% to about 1%.

A tenth embodiment, which is the capacitor film of any of the first through the ninth embodiments, wherein the dissipation factor of the capacitor film is from about 0.1% to about 1%, as measured from 1 kHz to 100 kHz at 23° C. and 50% RH.

An eleventh embodiment, which is the capacitor film of any of the first through the tenth embodiments, wherein a breakdown strength difference of the capacitor film from about 0° C. to about 170° C. is less than about 40% of the breakdown strength value at 23° C. as measured in accordance with ASTM D149.

A twelfth embodiment, which is the capacitor film of any of the first through the eleventh embodiments, wherein the capacitor film has a difference in capacitance at 1 kHz and from about 0° C. to about 170° C. of less than about +/−5%, based on a capacitance value at 23° C.

A thirteenth embodiment, which is the capacitor film of any of the first through the twelfth embodiments, wherein the capacitor film has a single glass transition temperature equal to or greater than about 170° C.

A fourteenth embodiment, which is the capacitor film of any of the first through the thirteenth embodiments, wherein the capacitor film comprise less than 2 carbonized inclusions having a diameter greater than about 20 microns in an area of 100 cm$^2$.

A fifteenth embodiment, which is the capacitor film of any of the first through the fourteenth embodiments, wherein the capacitor film has a film length of from about 10 m to about 10,000 m, and a film width of from about 300 mm to about 3,000 mm, wherein at least about 80% of the total film surface area is wrinkle-free.

A sixteenth embodiment, which is the capacitor film of any of the first through the fifteenth embodiments, wherein the capacitor film has a carbon/(oxygen+hydrogen) (C/(O+H)) ratio of less than about 1.25.

A seventeenth embodiment, which is the capacitor film of any of the first through the sixteenth embodiments, wherein the capacitor film has a Trouser tear strength in the machine direction of from about 0.5 N/mm to about 3.0 N/mm, as measured in accordance with ASTM D1938 using a test specimen having a 20 microns thickness.

An eighteenth embodiment, which is the capacitor film of any of the first through the seventeenth embodiments, wherein the capacitor film has a Trouser tear strength in the transverse direction of from about 0.5 N/mm to about 3.0 N/mm, as measured in accordance with ASTM D1938 using a test specimen having a 20 microns thickness.

A nineteenth embodiment, which is the capacitor film of any of the first through the eighteenth embodiments, wherein the capacitor film comprises less than about 1000 ppm of a solvent, based on the total weight of the capacitor film.

A twentieth embodiment, which is the capacitor film of any of the first through the nineteenth embodiments, wherein the polyetherimide is represented by Formula V:

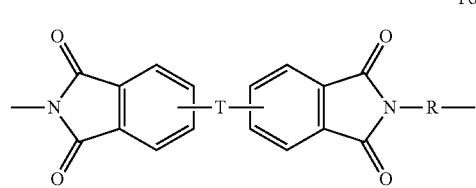

Formula V wherein T is —O— or a group represented by formula —O—Z—O—, wherein the divalent bonds of the —O— or the —O—Z—O— group are in the 3,3'; 3,4'; 4,3'; or 4,4' positions, wherein Z is a divalent aromatic hydrocarbon group having from 6 to 27 carbon atoms, a halogenated derivative thereof, a straight or branched chain alkylene group having from 2 to 10 carbon atoms, a halogenated derivative thereof, a cycloalkylene group having from 3 to 20 carbon atoms, a halogenated derivative thereof, or a group represented by formula —(C$_6$H$_{10}$)$_z$—, wherein z is an integer from 1 to 4; and wherein R is a residue of diamine comprising a m-phenylenediamine, a p-phenylenediamine, or combinations thereof.

A twenty-first embodiment, which is the capacitor film of the twentieth embodiment, wherein Z is a divalent group represented by Formula IVa:

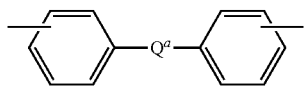

Formula IVa wherein Q$^a$ is a single bond, —O—, —S—, —C(O)—, —SO$_2$—, —SO—, or —C$_{y-2y}$—, halogenated derivatives thereof, and wherein y is an integer from 1 to 5.

A twenty-second embodiment, which is the capacitor film of any of the twentieth through the twenty-first embodiments, wherein Z is represented by Formula XI:

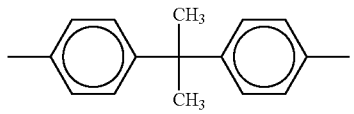

Formula XI

A twenty-third embodiment, which is the capacitor film of any of the first through the twenty-second embodiments, wherein the polyetherimide comprises from about 1.0 to about 1.4 molar equivalents of anhydride groups per 1.0 amine groups.

A twenty-fourth embodiment, which is the capacitor film of any of the first through the twenty-third embodiments, wherein the substituted or unsubstituted aromatic primary monoamine comprise substituted and unsubstituted anilines, substituted and unsubstituted naphthyl primary amines, and substituted and unsubstituted heteroaryl amines, wherein substituents are selected from the group consisting of C$_{6-12}$ aryl groups, halogenated C$_{6-12}$ aryl groups, C$_{1-12}$ alkyl groups, halogenated C$_{1-12}$ alkyl groups, sulfone groups, C$_{1-12}$ ester groups, C$_{1-12}$ amide groups, halogens, C$_{1-12}$ alkyl ether groups, C$_{6-12}$ aryl ether groups, and C$_{6-12}$ aryl keto groups bonded to the aromatic ring.

A twenty-fifth embodiment, which is the capacitor film of any of the first through the twenty-fourth embodiments, wherein the substituted or unsubstituted aromatic primary monoamine comprises aniline.

A twenty-sixth embodiment, which is the capacitor film of any of the first through the twenty-fifth embodiments, wherein the polyetherimide further comprises a polyetherimide sulfone.

A twenty-seventh embodiment, which is the capacitor film of the twenty-sixth embodiment, wherein a weight ratio of polyetherimide:polyetherimide sulfone is from about 99:1 to about 30:70.

A twenty-eighth embodiment, which is the capacitor film of any of the first through twenty-seventh embodiments, wherein the polyetherimide is present in the miscible polymer blend in an amount of from about 60 wt. % to about 99.9 wt. %.

A twenty-ninth embodiment, which is the capacitor film of any of the first through the twenty-eighth embodiments, wherein the polyetherimide is present in the miscible polymer blend in an amount of from about 70 wt. % to about 95 wt. %.

A thirtieth embodiment, which is the capacitor film of any of the first through the twenty-ninth embodiments, wherein the polyetherimide comprises less than about 15 wt. % of a polyetherimide other than the polyetherimide comprising units derived from polymerization of an amine comprising m-phenylenediamine, a p-phenylenediamine, or combinations thereof.

A thirty-first embodiment, which is the capacitor film of any of the first through the thirtieth embodiments, wherein the polyester comprises repeating structural units represented Formula XII:

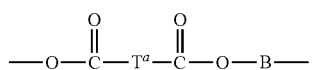

Formula XII wherein B is a divalent group derived from a dihydroxy compound, a C$_{2-10}$ alkylene group, a C$_{6-20}$ alicyclic group, a C$_{6-20}$ aromatic group, or a polyoxyalkylene group in which the alkylene groups contain from 2 to 6 carbon atoms, or alternatively 2, 3, or 4 carbon atoms; and wherein T$^a$ is a divalent group derived from an aromatic dicarboxylic acid, a C$_{2-10}$ alkylene group, a C$_{6-20}$ alicyclic group, a C$_{6-20}$ alkyl aromatic group, or a C$_{6-20}$ aromatic group.

A thirty-second embodiment, which is the capacitor film of any of the first through the thirty-first embodiments, wherein the polyester comprises polyethylene terephthalate (PET), poly(1,4-butylene terephthalate) (PBT), polyethylene naphthalate (PEN), poly(butylene naphthalate) (PBN), poly(1,3-propylene terephthalate) (PPT), poly(cyclohexylenedimethylene terephthalate) (PCT), polytrimethylene terephthalate (PTT), poly(1,4-butylene succinate) (PBS), glycol modified polyethylene terephthalate (PETG), glycol modified polycyclohexylenedimethylene terephthalate (PCTG), poly(1,4-cyclohexylenedimethylene 1,4-cyclohexanedicarboxylate) (PCCD), poly(cyclohexanedimethanol terephthalate), poly(cyclohexanedimethanol-co-ethylene terephthalate), copolymers thereof, or combinations thereof.

A thirty-third embodiment, which is the capacitor film of any of the first through the thirty-second embodiments, wherein the polyester comprises a low intrinsic viscosity polyethylene terephthalate having (i) a diethylene glycol derived content of from about 0.1 wt. % to about 4 wt. %, based on the total weight of the polyethylene terephthalate; (ii) an intrinsic viscosity of from about 0.1 dl/g to about 0.83 dl/g; and (iii) a carboxylic acid end groups content in an amount of from about 10 meq/kg to about 150 meq/kg.

A thirty-fourth embodiment, which is the capacitor film of the thirty-second embodiment, wherein the PET is derived from a recycled PET.

A thirty-fifth embodiment, which is the capacitor film of the thirty-second embodiment, wherein the PET is linear, and wherein the PET comprises less than about 3 wt. %, cyclic polyester, based on the total weight of the PET, as determined by proton nuclear magnetic resonance spectroscopy.

A thirty-sixth embodiment, which is the capacitor film of any of the first through the thirty-fifth embodiments, wherein the polyester is present in the miscible polymer blend in an amount of from about 0.1 wt. % to about 40 wt. %.

A thirty-seventh embodiment, which is the capacitor film of any of the first through the thirty-sixth embodiments, wherein the polyester is present in the miscible polymer blend in an amount of from about 5 wt. % to about 30 wt. %.

A thirty-eighth embodiment, which is the capacitor film of any of the first through the thirty-seventh embodiments, wherein the polyetherimide and the polyester are each present in the miscible polymer blend in an amount effective to provide for a single glass transition temperature of the capacitor film.

A thirty-ninth embodiment, which is the capacitor film of any of the first through the thirty-eighth embodiments, wherein the polyetherimide and the polyester are each present in a polymer composition for capacitor films in an amount effective to provide for a miscible polymer blend.

A fortieth embodiment, which is the capacitor film of any of the first through the thirty-ninth embodiments, wherein the miscible polymer blend further comprises a phosphorus-containing stabilizer in an amount from about 0 wt. % to about 2 wt. %, based on the total weight of the miscible polymer blend, wherein the phosphorus-containing stabilizers has a weight average molecular weight of equal to or greater than about 500 Da.

A forty-first embodiment, which is an article comprising the uniaxially-stretched, high yield extruded capacitor film of any of the first through the fortieth embodiments.

A forty-second embodiment, which is the article of the forty-first embodiment, further comprising a metal layer deposited on at least a portion of the film to form a metallized capacitor film.

A forty-third embodiment, which is the article of the forty-second embodiment, wherein the metal layer comprises a conductive metal.

A forty-fourth embodiment, which is the article of the forty-third embodiment, wherein the conductive metal comprises copper, aluminum, silver, gold, nickel, zinc, titanium, chromium, vanadium, tantalum, niobium, brass, or combinations thereof.

A forty-fifth embodiment, which is the article of any of the forty-second through the forty-fourth embodiments, wherein the metal layer has a metal layer thickness of from about 1 Angstrom to about 3,000 Angstroms.

A forty-sixth embodiment, which is the article of any of the forty-second through the forty-fifth embodiments, wherein the metal layer has a metal layer thickness of from about 1 Angstrom to about 2,820 Angstroms.

A forty-seventh embodiment, which is the article of any of the forty-second through the forty-sixth embodiments, wherein the metal layer has a metal layer resistivity of from about 0.1 to about 100 Ohms per square.

A forty-eighth embodiment, which is the article of any of the forty-second through the forty-seventh embodiments, wherein the metal layer is deposited on at least a portion of the film by vacuum metal vapor deposition, high temperature vacuum deposition, chemical vapor deposition, atomic layer deposition, metal sputtering, plasma treatments, electron beam treatments, chemical oxidation or reduction reactions, electroless wet-chemical deposition, or combinations thereof.

A forty-ninth embodiment, which is the article of any of the forty-second through the forty-eighth embodiments, wherein the metallized capacitor film is wound to form a wound metallized capacitor film.

A fiftieth embodiment, which is a capacitor comprising the wound metallized film of the forty-ninth embodiment.

A fifty-first embodiment, which is an electronic article comprising the capacitor of the fiftieth embodiment.

A fifty-second embodiment, which is an automotive inverter comprising the capacitor of the fiftieth embodiment.

A fifty-third embodiment, which is an automotive converter comprising the capacitor of the fiftieth embodiment.

A fifty-fourth embodiment, which is a uniaxially-stretched, high yield extruded capacitor film comprising a miscible polymer blend comprising a polyetherimide and a polyester; wherein the polyetherimide comprises units derived from polymerization of an aromatic dianhydride with a diamine comprising a m-phenylenediamine, a p-phenylenediamine, or combinations thereof; wherein the polyetherimide is endcapped with a substituted or unsubstituted aromatic primary monoamine; wherein the polyester comprises repeating structural units derived from polymerization of an aromatic dicarboxylic acid with a dihydroxy compound; wherein the high yield extruded capacitor film is solvent-free and comprises equal to or greater than about 90 wt. % of the miscible polymer blend entering an extruder used for manufacturing the capacitor film, based on the total weight of miscible polymer blend prior to entering the extruder; and wherein the capacitor film has a film thickness of from about 0.1 microns to about 20 microns.

A fifty-fifth embodiment, which is the capacitor film of the fifty-fourth embodiment, wherein the polyetherimide further comprises a polyetherimide sulfone.

A fifty-sixth embodiment, which is a uniaxially-stretched, high yield extruded capacitor film comprising a miscible polymer blend comprising a polyetherimide sulfone and a polyester; wherein the polyetherimide sulfone comprises units derived from polymerization of an aromatic dianhydride with a diamine comprising a diamino diphenyl sulfone; wherein the polyetherimide sulfone is endcapped with a substituted or unsubstituted aromatic primary monoamine; wherein the polyester comprises repeating structural units derived from polymerization of an aromatic dicarboxylic acid with a dihydroxy compound; wherein the high yield extruded capacitor film is solvent-free and comprises equal to or greater than about 90 wt. % of the miscible polymer blend entering an extruder used for manufacturing the capacitor film, based on the total weight of miscible polymer blend prior to entering the extruder.

A fifty-seventh embodiment, which is the capacitor film of the fifty-sixth embodiment, wherein the capacitor film has a film thickness of from about 0.1 microns to about 20 microns.

A fifty-eighth embodiment, which is the capacitor film of any of the fifty-sixth through fifty-seventh embodiments, wherein the polyetherimide sulfone has a weight average molecular weight of from about 20,000 Da to about 400,000 Da, as determined by gel permeation chromatography (GPC) using a polystyrene standard; wherein the polyetherimide sulfone has a ratio of viscosity at 100 $sec^{-1}$ to a viscosity at 5,000 $sec^{-1}$ of less than about 11, as measured by capillary rheometry at 340° C.; wherein the polyetherimide sulfone has a tensile modulus of equal to or greater than about 380,000 psi (2,618 MPa), as determined in accordance with ASTM D638; wherein the polyester has a weight average molecular weight of from about 25,000 Da to about 75,000 Da, as measured by GPC; wherein the polyester has an intrinsic viscosity of from about 0.1 dl/g to about 0.83 dl/g; wherein the capacitor film has a glass transition temperature of greater than about 170° C.; wherein the capacitor film has a heat distortion temperature of equal to or greater than about 150° C. as measured in accordance with ASTM D648 at 264 psi (1.8 Mpa) on 3.2 millimeters (mm) thick samples; wherein the capacitor film has a dielectric constant of from about 3 to about 5 as measured in accordance with ASTM D150 at 1 kHz, 23° C. and 50% relative humidity (RH); wherein the capacitor film has a dissipation factor of from about 0% to about 1% as measured at 1 kHz, 23° C. and 50% RH; wherein the capacitor film has a breakdown strength of from about 500 V/micron to about 800 V/micron, as measured in accordance with ASTM D149 at 23° C.; wherein the capacitor film has a wrinkle-free region having a film thickness variation of less than about +/−10% of the film thickness, based on the average thickness of the film over a specific measured area; and wherein the capacitor film has a surface roughness average (Ra) of less than about +/−3%, based on an average film thickness as measured by optical profilometry.

A fifty-ninth embodiment, which is a method of manufacturing the uniaxially-stretched, high yield extruded capacitor film of any of the first through the fifty-eighth embodiments comprising:

(a) extruding the miscible polymer blend to form the high yield extruded capacitor film, wherein the high yield extruded capacitor film comprises equal to or greater than about 90 wt. % of the miscible polymer blend entering an extruder used for manufacturing the capacitor film, based on the total weight of miscible polymer blend prior to entering the extruder; and (b) uniaxially stretching the high yield extruded capacitor film to form the uniaxially-stretched, high yield extruded capacitor film.

A sixtieth embodiment, which is a method of manufacturing the uniaxially-stretched, high yield extruded capacitor film of any of the first through the fifty-ninth embodiments comprising:

(a) combining the polyetherimide and the polyester to form a miscible polymer blend;

(b) melting and mixing the miscible polymer blend to form a molten polymer;

(c) filtering the molten polymer to remove particles greater than about 1 micron to form a filtered molten polymer;

(d) extruding the filtered molten polymer through a flat die at a temperature of from about 250° C. to about 500° C. to form a high yield extruded capacitor film, wherein the high yield extruded capacitor film comprises equal to or greater than about 90 wt. % of the miscible polymer blend entering an extruder used for manufacturing the capacitor film, based on the total weight of miscible polymer blend prior to entering the extruder; and (e) uniaxially stretching the high yield extruded capacitor film to form the uniaxially-stretched, high yield extruded capacitor film.

A sixty-first embodiment, which is the method of the sixtieth embodiment, further comprising depositing a metal layer on at least a portion of the film to form a metallized capacitor film.

A sixty-second embodiment, which is the method of the sixty-first embodiment, further comprising winding the metallized capacitor film to form a wound metallized capacitor film.

A sixty-third embodiment, which is the method of any of the sixty-first through the sixty-second embodiments, further comprising stacking the metallized capacitor films to form a stacked film capacitor.

A sixty-fourth embodiment, which is the method of the sixty-third embodiment, further comprising dicing the stacked film capacitor to form diced film capacitors.

A sixty-fifth embodiment, which is a method of manufacturing the uniaxially-stretched, high yield extruded capacitor film of the fifty-sixth embodiment comprising:

(a) extruding the miscible polymer blend to form the high yield extruded capacitor film, wherein the high yield extruded capacitor film comprises equal to or greater than about 90 wt. % of the miscible polymer blend entering an extruder used for manufacturing the capacitor film, based on the total weight of miscible polymer blend prior to entering the extruder; and (b) uniaxially stretching the high yield extruded capacitor film to form the uniaxially-stretched, high yield extruded capacitor film.

A sixty-sixth embodiment, which is the a method of manufacturing the uniaxially-stretched, high yield extruded capacitor film of the fifty-sixth embodiment comprising:

(a) combining the polyetherimide sulfone and the polyester to form a miscible polymer blend;

(b) melting and mixing the miscible polymer blend to form a molten polymer;

(c) filtering the molten polymer to remove particles greater than about 1 micron to form a filtered molten polymer;

(d) extruding the filtered molten polymer through a flat die at a temperature of from about 250° C. to about 500° C. to form a high yield extruded capacitor film, wherein the high yield extruded capacitor film comprises equal to or greater than about 90 wt. % of the miscible polymer blend entering an extruder used for manufacturing the capacitor film, based on the total weight of miscible polymer blend prior to entering the extruder; and (e) uniaxially stretching the high yield extruded capacitor film to form the uniaxially-stretched, high yield extruded capacitor film.

While embodiments of the disclosure have been shown and described, modifications thereof can be made without departing from the spirit and teachings of the invention. The embodiments and examples described herein are exemplary only, and are not intended to be limiting. Many variations and modifications of the invention disclosed herein are possible and are within the scope of the invention.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the detailed description of the present invention. The disclosures of all patents, patent applications, and publications cited herein are hereby incorporated by reference.

What is claimed is:

1. A uniaxially-stretched, high yield extruded capacitor film comprising a miscible polymer blend comprising
 a polyetherimide and
 a polyester;
 wherein the polyetherimide comprises units derived from polymerization of an aromatic dianhydride with a diamine comprising a m-phenylenediamine, a p-phenylenediamine, or combinations thereof; wherein the polyetherimide is endcapped with a substituted or unsubstituted aromatic primary monoamine; wherein the polyetherimide is represented by Formula V:

Formula V

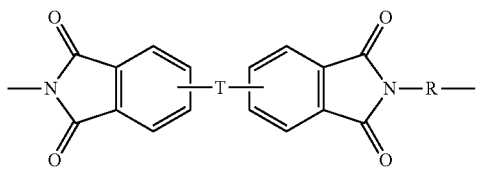

wherein T is —O— or a group represented by formula —O—Z—O—, wherein the divalent bonds of the —O— or the —O—Z—O— group are in the 3,3'; 3,4'; 4,3'; or 4,4' positions, wherein Z is a divalent aromatic hydrocarbon group having from 6 to 27 carbon atoms, a halogenated derivative thereof, a straight or branched chain alkylene group having from 2 to 10 carbon atoms, a halogenated derivative thereof, a cycloalkylene group having from 3 to 20 carbon atoms, a halogenated derivative thereof, or a group represented by formula —$(C_6H_{10})_z$—, wherein z is an integer from 1 to 4; wherein R is a residue of diamine comprising a m-phenylenediamine, a p-phenylenediamine, or combinations thereof;

wherein the polyester has a specific gravity greater than a specific gravity of the polyetherimide, and the polyester comprises repeating structural units represented by Formula XIII or Formula XIV:

Formula XIII

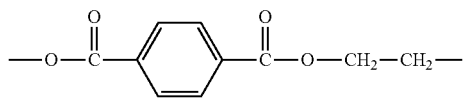

Formula XIV

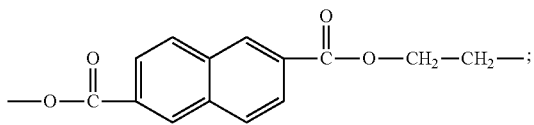

wherein the polyester is present in the miscible polymer blend in an amount of from 15 wt. % to 25 wt. %, the polyetherimide is present in the miscible polymer blend in an amount of 75 wt. % to 85 wt. %, and the polyetherimide and the polyester are each present in the miscible polymer blend in an amount effective to provide for a single glass transition temperature of the capacitor film equal to or greater than 170° C.; and wherein the high yield extruded capacitor film comprises equal to or greater than about 90 wt. % of the miscible polymer blend entering an extruder used for manufacturing the capacitor film, based on the total weight of miscible polymer blend prior to entering the extruder.

2. The capacitor film of claim 1, wherein the capacitor film has a thickness of from about 0.1 microns to about 50 microns.

3. The capacitor film of claim 1,
wherein the polyetherimide has a weight average molecular weight of from about 20,000 Da to about 400,000 Da, as determined by gel permeation chromatography (GPC) using a polystyrene standard;
wherein the polyetherimide has a ratio of viscosity at 100 $sec^{-1}$ to a viscosity at 5,000 $sec^{-1}$ of less than about 11, as measured by capillary rheometry at 340° C.;
wherein the polyetherimide has a tensile modulus of equal to or greater than about 380,000 psi (2,618 MPa), as determined in accordance with ASTM D638;
wherein the polyester has a weight average molecular weight of from about 25,000 Da to about 75,000 Da, as measured by GPC; wherein the polyester has an intrinsic viscosity of from about 0.1 dl/g to about 0.83 dl/g; wherein the capacitor film has a glass transition temperature of greater than about 170° C.;
wherein the capacitor film has a heat distortion temperature of equal to or greater than about 150° C. as measured in accordance with ASTM D648 at 264 psi (1.8 Mpa) on 3.2 millimeters (mm) thick samples;
wherein the capacitor film has a dielectric constant of from about 3 to about 5 as measured in accordance with ASTM D150 at 1 kHz, 23° C. and 50% relative humidity (RH);
wherein the capacitor film has a dissipation factor of from about 0% to about 1% as measured at 1 kHz, 23° C. and 50% RH;
wherein the capacitor film has a breakdown strength of from about 500 V/micron to about 800 V/micron, as measured in accordance with ASTM D149 at 23° C.;
wherein the capacitor film has a wrinkle-free region having a film thickness variation of less than about +/−10% of the film thickness, based on the average thickness of the film over a specific measured area; and
wherein the capacitor film has a surface roughness average (Ra) of less than about +/−3%, based on an average film thickness as measured by optical profilometry.

4. The capacitor film of claim 1, comprising at least one of the following conditions selected from the group consisting of:
(a) the capacitor film has a dynamic coefficient of friction on a metallized surface, on aluminum, and/or on itself of less than about 0.75, as measured in accordance with ASTM D1894 or wherein the capacitor film has a static coefficient of friction on a metallized surface, on aluminum, and/or on itself of less than about 0.75, as measured in accordance with ASTM D1894;
(b) a dielectric constant of the capacitor film at 1 kHz remains essentially unchanged from about 0° C. to about 170° C., wherein the dielectric constant varies by less than about 20%, based on the highest dielectric constant value within a temperature range of from about 0° C. to about 170° C.;
(c) a dissipation factor of the capacitor film is from about 0.1% to about 1%, as measured from 1 kHz to 100 kHz at 23° C. and 50% RH;
(d) a breakdown strength difference of the capacitor film from about 0° C. to about 170° C. is less than about 40% of the breakdown strength value at 23° C. as measured in accordance with ASTM D149;
(e) the capacitor film has a difference in capacitance at 1 kHz and from about 0° C. to about 170° C. of less than about +/−5%, based on a capacitance value at 23° C.;
(f) the capacitor film has a single glass transition temperature equal to or greater than about 170° C.;
(g) the capacitor film comprise less than 2 carbonized inclusions having a diameter greater than about 20 microns in an area of 100 $cm^2$;
(h) the capacitor film has a film length of from about 10 m to about 10,000 m, and a film width of from about 300 mm to about 3,000 mm, wherein at least about 80% of the total film surface area is wrinkle-free; and
(i) the capacitor film has a carbon/(oxygen+hydrogen) (C/(O+H)) ratio of less than about 1.25.

5. The capacitor film of claim 1,
wherein the capacitor film has a Trouser tear strength in the machine direction of from about 0.5 N/mm to about 3.0 N/mm, as measured in accordance with ASTM D1938 using a test specimen having a 20 microns thickness and
wherein the capacitor film has a Trouser tear strength in the transverse direction of from about 0.5 N/mm to about 3.0 N/mm, as measured in accordance with ASTM D1938 using a test specimen having a 20 microns thickness.

6. The capacitor film of claim 1, wherein Z is a divalent group represented by Formula IVa:

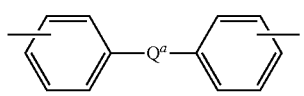

Formula IVa wherein $Q^a$ is a single bond, —O—, —S—, —C(O)—, —SO$_2$—, —SO—, or —C$_{y\text{-}2y}$—, halogenated derivatives thereof, and wherein y is an integer from 1 to 5.

7. The capacitor film of claim 1, wherein Z is represented by Formula XI:

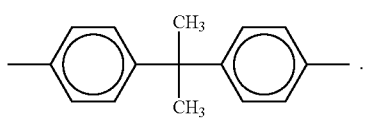

Formula XI

8. The capacitor film of claim 1, wherein the polyetherimide comprises from about 1.0 to about 1.4 molar equivalents of anhydride groups per 1.0 amine groups.

9. The capacitor film of claim 1, wherein the substituted or unsubstituted aromatic primary monoamine comprise substituted and unsubstituted anilines, substituted and unsubstituted naphthyl primary amines, and substituted and unsubstituted heteroaryl amines, wherein substituents are selected from the group consisting of $C_{6\text{-}12}$ aryl groups, halogenated $C_{6\text{-}12}$ aryl groups, $C_{1\text{-}12}$ alkyl groups, halogenated $C_{1\text{-}12}$ alkyl groups, sulfone groups, $C_{1\text{-}12}$ ester groups, $C_{1\text{-}12}$ amide groups, halogens, $C_{1\text{-}12}$ alkyl ether groups, $C_{6\text{-}12}$ aryl ether groups, and $C_{6\text{-}12}$ aryl keto groups bonded to the aromatic ring.

10. The capacitor film of claim 1, wherein the substituted or unsubstituted aromatic primary monoamine comprises aniline and wherein the polyetherimide further comprises a polyetherimide sulfone.

11. The capacitor film of claim 10, wherein a weight ratio of polyetherimide:polyetherimide sulfone is from about 99:1 to about 30:70.

12. The capacitor film of claim 1, wherein the polyetherimide comprises less than about 15 wt. % of a polyetherimide other than the polyetherimide comprising units derived from polymerization of an amine comprising m-phenylenediamine, a p-phenylenediamine, or combinations thereof.

13. The capacitor film of claim 1, wherein the polyester comprises a low intrinsic viscosity polyethylene terephthalate having (i) a diethylene glycol derived content of from about 0.1 wt. % to about 4 wt. %, based on the total weight of the polyethylene terephthalate; (ii) an intrinsic viscosity of from about 0.1 dl/g to about 0.83 dl/g; and (iii) a carboxylic acid end groups content in an amount of from about 10 meq/kg to about 150 meq/kg.

14. The capacitor film of claim 1, wherein the miscible polymer blend has a specific gravity of greater than 1.281 to 1.31.

15. A uniaxially-stretched, high yield extruded capacitor film comprising a miscible polymer blend comprising
a polyetherimide and
a polyester;
wherein the polyetherimide comprises units derived from polymerization of an aromatic dianhydride with a diamine comprising a m-phenylenediamine, a p-phenylenediamine, or combinations thereof; wherein the polyetherimide is endcapped with a substituted or unsubstituted aromatic primary monoamine; wherein the polyetherimide is represented by Formula V:

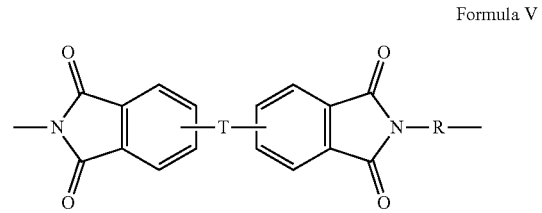

Formula V wherein T is —O— or a group represented by formula —O—Z—O—, wherein the divalent bonds of the —O— or the —O—Z—O— group are in the 3,3'; 3,4'; 4,3'; or 4,4' positions, wherein Z is a divalent aromatic hydrocarbon group represented by Formula:

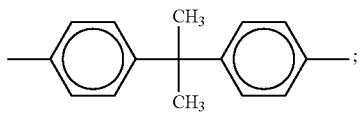

wherein the polyester comprises repeating structural units derived from polymerization of an aromatic dicarboxylic acid with a dihydroxy compound; wherein the polyester has a specific gravity greater than a specific gravity of the polyetherimide, and the polyester comprises repeating structural units represented by Formula XIII or Formula XIV:

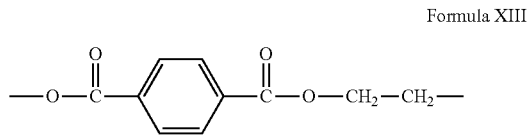

Formula XIII

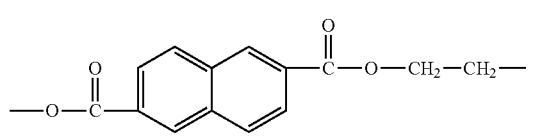

Formula XIV wherein the polyester is present in the miscible polymer blend in an amount of from 15 wt. % to 25 wt. %, and the polyetherimide is present in the miscible polymer blend in an amount of 75 wt % to 85 wt. %, and the polyetherimide and the polyester are each present in the miscible polymer blend in an amount effective to provide for a single glass transition temperature of the capacitor film equal to or greater than 170° C.;

wherein the high yield extruded capacitor film is solvent-free and comprises equal to or greater than about 90 wt. % of the miscible polymer blend entering an extruder used for manufacturing the capacitor film, based on the total weight of miscible polymer blend prior to entering the extruder; and wherein the capacitor film has a film thickness of from about 0.1 microns to about 20 microns.

16. The capacitor film of claim 15, wherein the polyetherimide further comprises a polyetherimide sulfone.

* * * * *